(12) United States Patent
Wang et al.

(10) Patent No.: US 12,395,985 B2
(45) Date of Patent: Aug. 19, 2025

(54) EFFICIENT SCHEDULING OF A TWO-HOP COMMUNICATION LINK

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 17/933,255

(22) Filed: Sep. 19, 2022

(65) Prior Publication Data

US 2024/0098733 A1   Mar. 21, 2024

(51) Int. Cl.
*H04W 72/1268* (2023.01)
*H04L 1/1812* (2023.01)
*H04W 72/23* (2023.01)
*H04W 92/10* (2009.01)

(52) U.S. Cl.
CPC ....... *H04W 72/1268* (2013.01); *H04L 1/1812* (2013.01); *H04W 72/23* (2023.01); *H04W 92/10* (2013.01)

(58) Field of Classification Search
CPC . H04W 72/1268; H04W 72/23; H04W 92/10; H04W 72/25; H04W 92/18; H04W 88/04; H04L 1/1812; H04L 2001/0097; H04L 1/1896; H04L 1/1887
See application file for complete search history.

(56) References Cited

U.S. PATENT DOCUMENTS

| | | | | |
|---|---|---|---|---|
| 2016/0338095 A1* | 11/2016 | Faurie | | H04W 72/20 |
| 2022/0124772 A1* | 4/2022 | Xu | | H04W 76/14 |
| 2023/0171036 A1* | 6/2023 | Selvanesan | | H04L 1/1671 |
| | | | | 370/315 |
| 2023/0345456 A1* | 10/2023 | Dees | | H04L 47/30 |

* cited by examiner

*Primary Examiner* — Chae S Lee
(74) *Attorney, Agent, or Firm* — Harrity & Harrity, LLP

(57) ABSTRACT

Various aspects of the present disclosure generally relate to wireless communication. In some aspects, a controller user equipment (UE) may transmit, to a network node, a relay scheduling request that indicates a request to schedule access to a universal mobile telecommunications system air interface (Uu) based at least in part on relaying one or more sidelink retransmissions associated with at least a first sidelink between the controller UE and a first sidelink UE. The UE may communicate the one or more sidelink retransmissions between the controller UE and the network node based at least in part on using the Uu. Numerous other aspects are described.

30 Claims, 12 Drawing Sheets

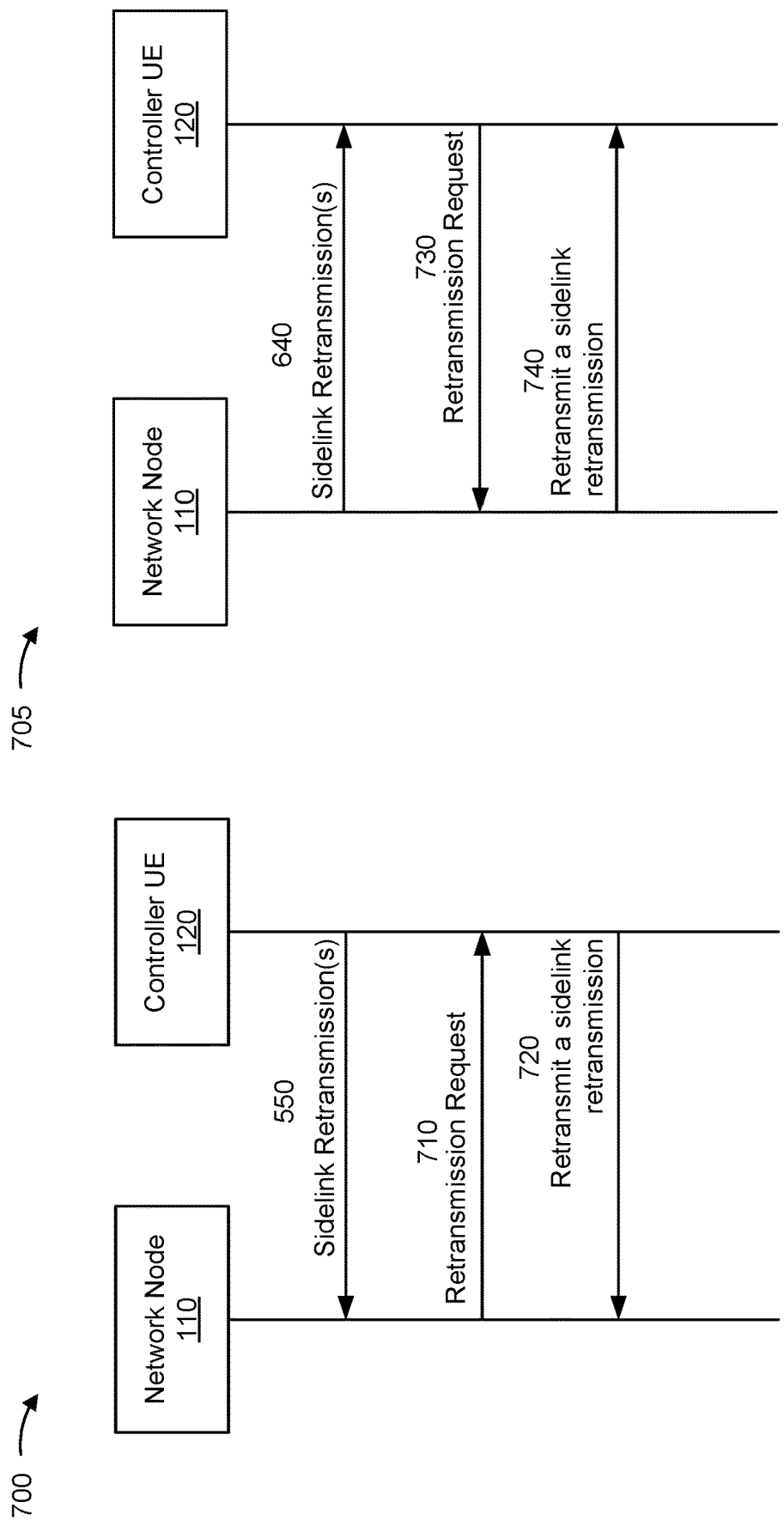

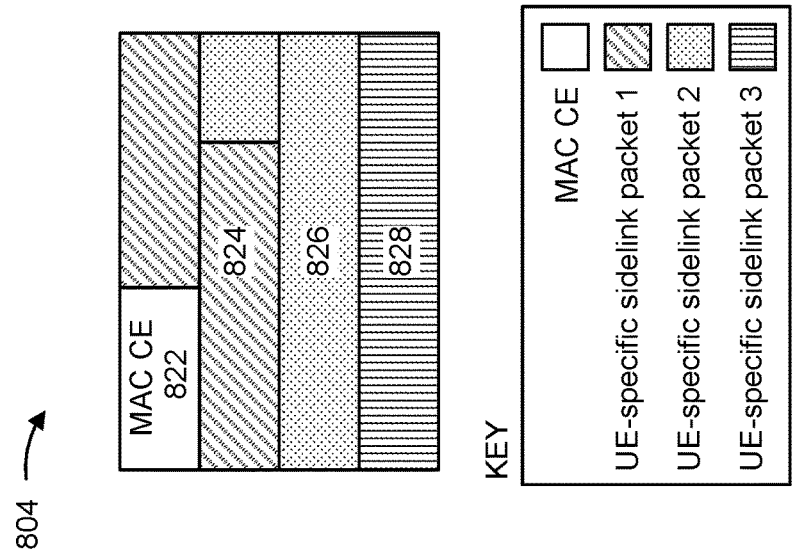
FIG. 8C
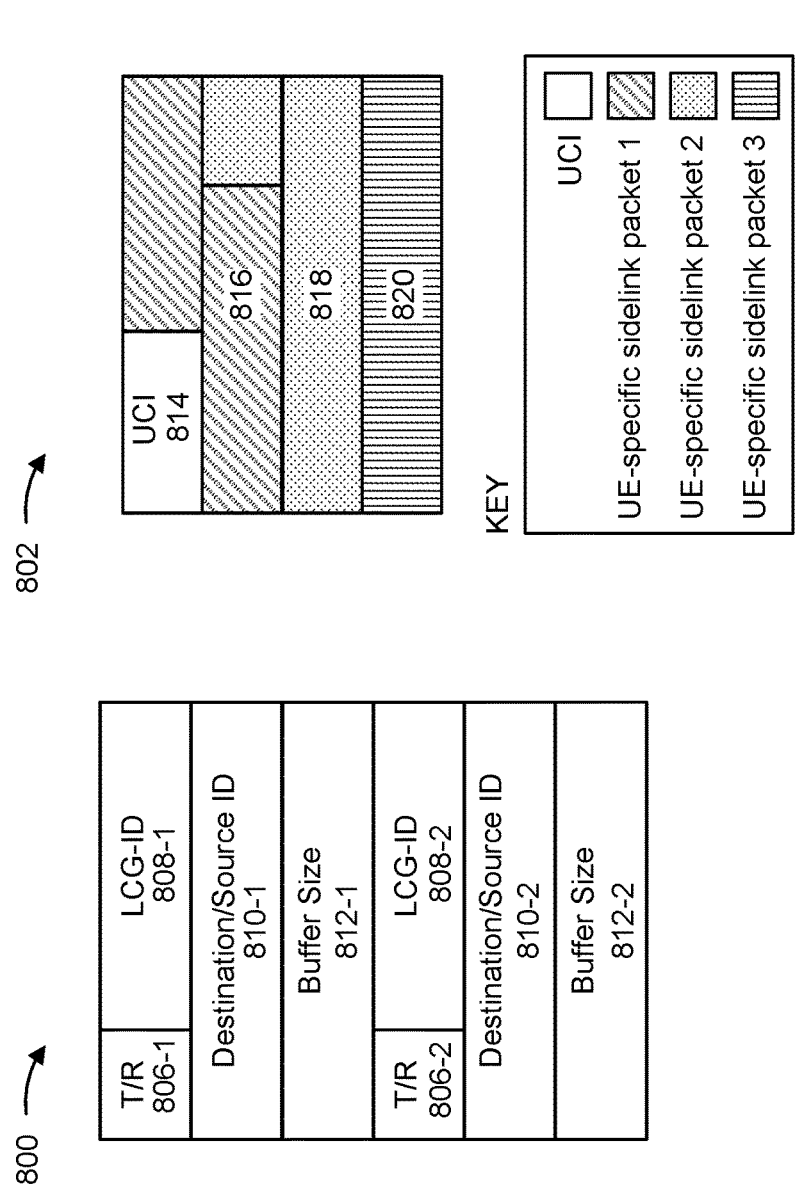
FIG. 8B
FIG. 8A

EFFICIENT SCHEDULING OF A TWO-HOP COMMUNICATION LINK

FIELD OF THE DISCLOSURE

Aspects of the present disclosure generally relate to wireless communication and to techniques and apparatuses for efficient scheduling of a two-hop communication link.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a controller user equipment (UE). The method may include transmitting, to a network node, a relay scheduling request that indicates a request to schedule access to a universal mobile telecommunications system air interface (Uu) based at least in part on relaying one or more sidelink retransmissions associated with at least a first sidelink between the controller UE and a first sidelink UE. The method may include communicating the one or more sidelink retransmissions between the controller UE and the network node based at least in part on using the Uu.

Some aspects described herein relate to a method of wireless communication performed by a network node. The method may include receiving, from a controller UE, a relay scheduling request that indicates to schedule access to a Uu based at least in part on relaying one or more sidelink retransmissions associated with at least a first sidelink between the controller UE and a first sidelink UE. The method may include relaying the one or more sidelink retransmissions between at least the controller UE and the first sidelink UE based at least in part on the relay scheduling request.

Some aspects described herein relate to an apparatus for wireless communication at a controller UE. The apparatus may include a memory and one or more processors coupled to the memory. The one or more processors may be configured to transmit, to a network node, a relay scheduling request that indicates a request to schedule access to a Uu based at least in part on relaying one or more sidelink retransmissions associated with at least a first sidelink between the controller UE and a first sidelink UE. The one or more processors may be configured to communicate the one or more sidelink retransmissions between the controller UE and the network node based at least in part on using the Uu.

Some aspects described herein relate to an apparatus for wireless communication at a network node. The apparatus may include a memory and one or more processors coupled to the memory. The one or more processors may be configured to receive, from a controller UE, a relay scheduling request that indicates to schedule access to a Uu based at least in part on relaying one or more sidelink retransmissions associated with at least a first sidelink between the controller UE and a first sidelink UE. The one or more processors may be configured to relay the one or more sidelink retransmissions between at least the controller UE and the first sidelink UE based at least in part on the relay scheduling request.

Some aspects described herein relate to a non-transitory computer-readable medium that stores a set of instructions for wireless communication by a controller UE. The set of instructions, when executed by one or more processors of the UE, may cause the UE to transmit, to a network node, a relay scheduling request that indicates a request to schedule access to a Uu based at least in part on relaying one or more sidelink retransmissions associated with at least a first sidelink between the controller UE and a first sidelink UE. The set of instructions, when executed by one or more processors of the UE, may cause the UE to communicate the one or more sidelink retransmissions between the controller UE and the network node based at least in part on using the Uu.

Some aspects described herein relate to a non-transitory computer-readable medium that stores a set of instructions for wireless communication by a network node. The set of instructions, when executed by one or more processors of the network node, may cause the network node to receive, from a controller UE, a relay scheduling request that indicates to schedule access to a Uu based at least in part on relaying one or more sidelink retransmissions associated with at least a first sidelink between the controller UE and a first sidelink UE. The set of instructions, when executed by one or more processors of the network node, may cause the network node to relay the one or more sidelink retransmissions between at least the controller UE and the first sidelink UE based at least in part on the relay scheduling request.

Some aspects described herein relate to an apparatus for wireless communication. The apparatus may include means for transmitting, to a network node, a relay scheduling request that indicates a request to schedule access to a Uu based at least in part on relaying one or more sidelink retransmissions associated with at least a first sidelink between the controller UE and a first sidelink UE. The apparatus may include means for communicating the one or more sidelink retransmissions between the controller UE and the network node based at least in part on using the Uu.

Some aspects described herein relate to an apparatus for wireless communication. The apparatus may include means for receiving, from a controller UE, a relay scheduling request that indicates to schedule access to a Uu based at least in part on relaying one or more sidelink retransmissions associated with at least a first sidelink between the controller UE and a first sidelink UE. The apparatus may include means for relaying the one or more sidelink retransmissions between at least the controller UE and the first sidelink UE based at least in part on the relay scheduling request.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A and 7B are diagrams illustrating a first example of a first wireless communication process and a second example of a second wireless communication process between a network node and a controller UE, in accordance with the present disclosure.

FIGS. 8A, 8B, and 8C are diagrams illustrating a first example of a buffer status report, a second example of an uplink aggregated retransmission communication, and a third example of a downlink aggregated retransmission communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
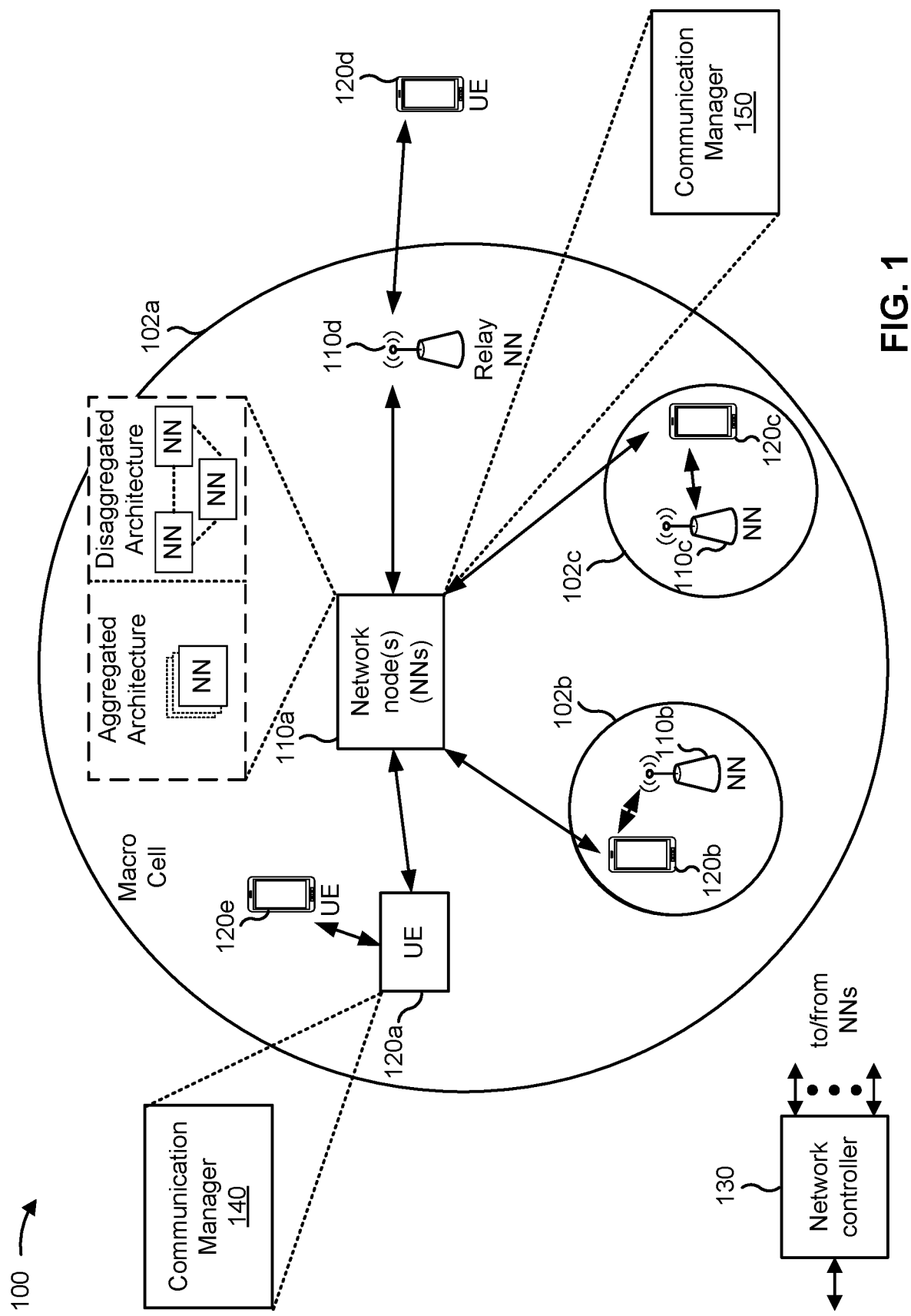
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a controller UE (e.g., the UE 120) may include a communication manager 140. As described in more detail elsewhere herein, the communication manager 140 may transmit, to a network node, a relay scheduling request that indicates a request to schedule access to a universal mobile telecommunications system air interface (Uu) based at least in part on relaying one or more sidelink retransmissions associated with at least a first sidelink between a controller UE and a first sidelink UE; and communicate the one or more sidelink retransmissions between the controller UE and the network node based at least in part on using the Uu. Additionally, or alternatively, the communication manager 140 may perform one or more other operations described herein.

In some aspects, a network node (e.g., the network node 110) may include a communication manager 150. As described in more detail elsewhere herein, the communication manager 150 may receive, from a controller UE, a relay scheduling request that indicates to schedule access to a Uu based at least in part on relaying one or more sidelink retransmissions associated with at least a first sidelink between the controller UE and a first sidelink UE; and relay the one or more sidelink retransmissions between at least the controller UE and the first sidelink UE based at least in part on the relay scheduling request. Additionally, or alternatively, the communication manager 150 may perform one or more other operations described herein.

As indicated above, FIG. 1 is provided as an example. Other examples may differ from what is described with regard to FIG. 1.

Figure 2:
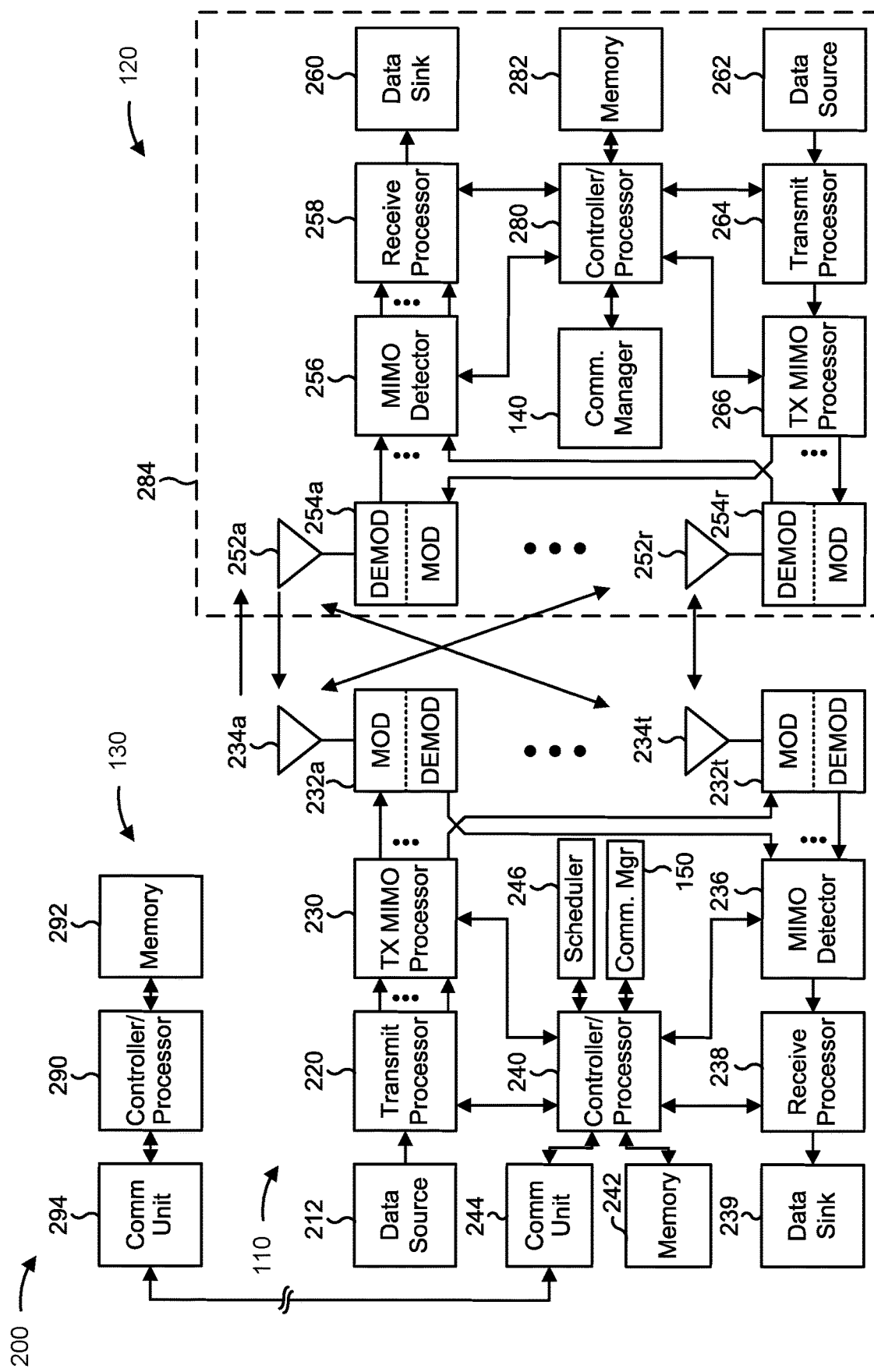
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the network node 110, the controller/processor 280 of the UE 120, and/or any other component(s) of FIG. 2 may perform one or more techniques associated with efficient scheduling of a two-hop communication link, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a controller UE (e.g., the UE 120) includes means for transmitting, to a network node, a relay scheduling request that indicates a request to schedule access to a Uu based at least in part on relaying one or more sidelink retransmissions associated with at least a first sidelink between the controller UE and a first sidelink UE; and/or means for communicating the one or more sidelink retransmissions between the controller UE and the network node based at least in part on using the Uu. The means for the controller UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for receiving, from a controller UE, a relay scheduling request that indicates to schedule access to a Uu based at least in part on relaying one or more sidelink retransmissions associated with at least a first sidelink between the controller UE and a first sidelink UE; and/or means for relaying the one or more sidelink retransmissions between at least the controller UE and the first sidelink UE based at least in part on the relay scheduling request. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
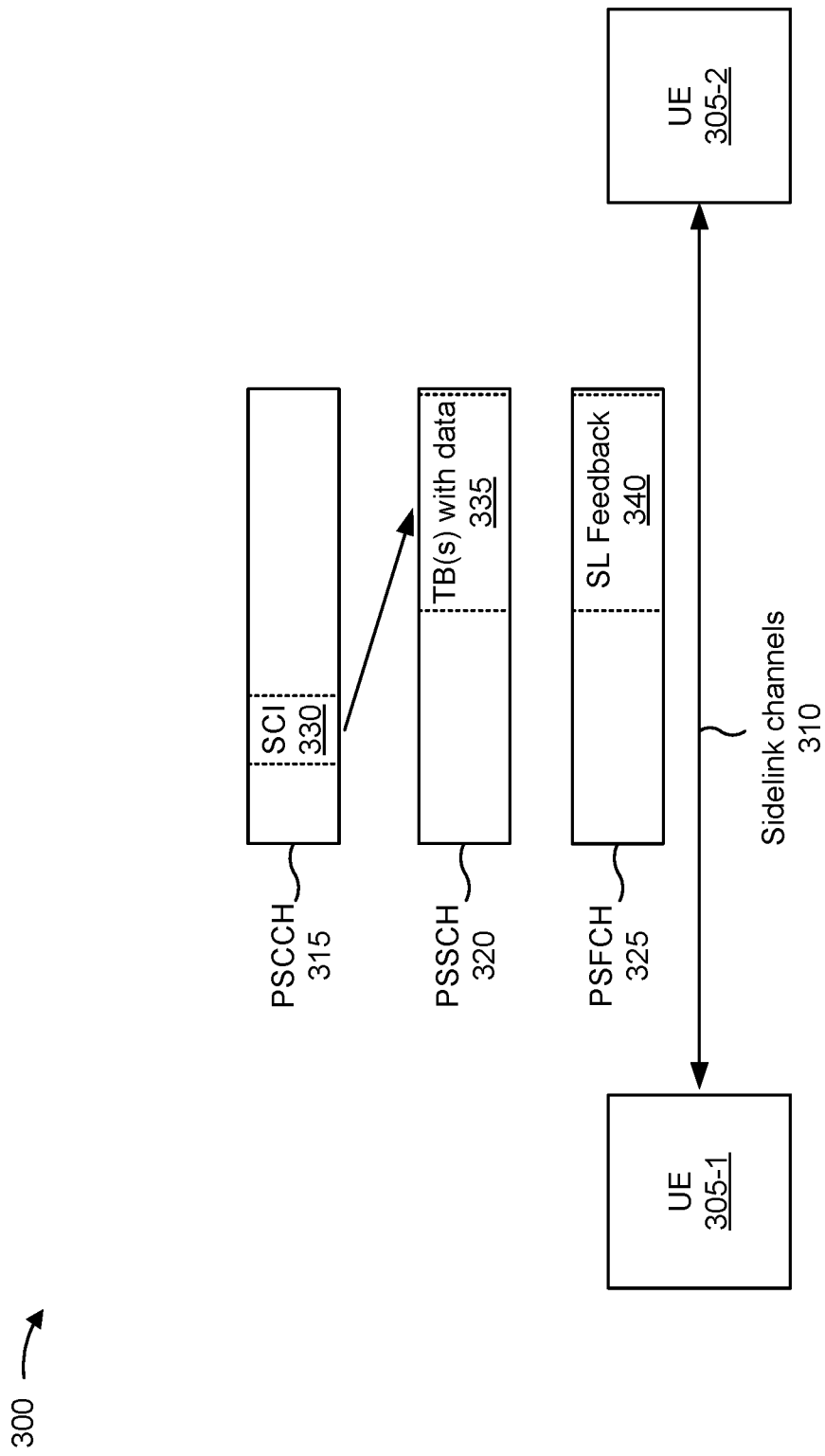
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. A "sidelink channel" may alternatively be referred to as a sidelink. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement (ACK) or negative acknowledgement (NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a transmission mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure a RSSI parameter (e.g., a sidelink-RSSI (S-RSSI) parameter) associated with various sidelink channels, may measure a RSRP parameter (e.g., a PSSCH-RSRP parameter) associated with various sidelink channels, and/or may measure a RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
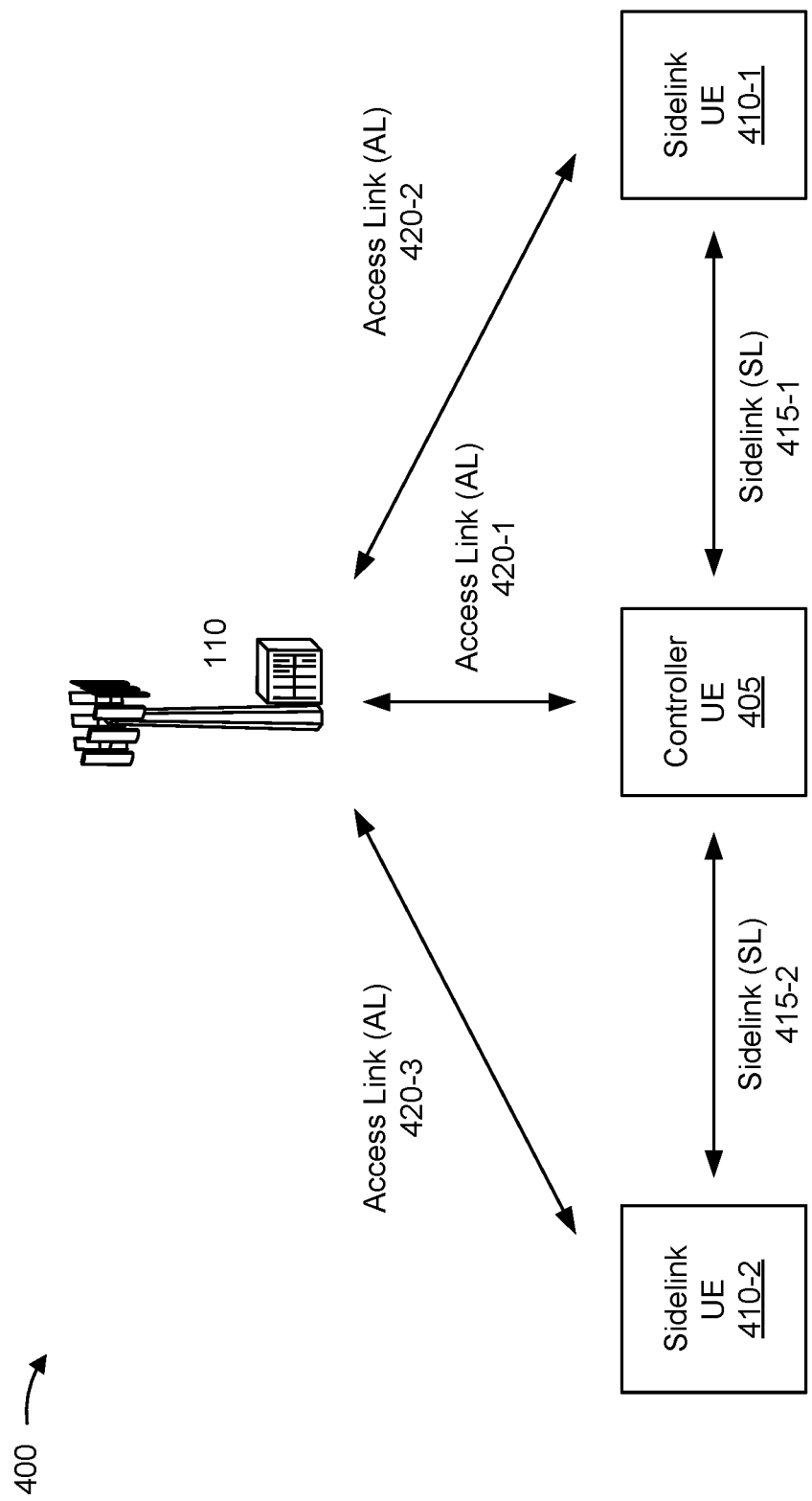
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a controller UE 405 may communicate with multiple sidelink UEs, such as a first sidelink UE 410-1 and a second sidelink UE 410-2, based at least in part on using a first sidelink 415-1 and/or a second sidelink 415-2, as described above in connection with FIG. 3. A "sidelink" may denote a direct link between UEs 120 (e.g., via a PC5 interface). The controller UE 405, the first sidelink UE 410-1, and/or the second sidelink UE 410-2 may correspond to one or more UEs described elsewhere herein, such as the UE 120 of FIG. 1. In some aspects, the first sidelink UE 410-1 and/or the second sidelink UE 410-2 may be implemented as an IoT device and/or a reduced capacity (RedCap) device. The controller UE 405 may include more capabilities relative to the first sidelink UE 410-1 and/or the second sidelink UE 410-2, such as more memory, a faster processor, and/or a transceiver associated with a wider range of frequencies and/or transmission power levels. Alternatively or additionally, the controller UE 405, the first sidelink UE 410-1, and/or the second sidelink UE 410-2 may have equivalent capabilities. The first sidelink UE 410-1 and/or the second sidelink UE 410-2 may communicate sensor and/or actuator information to the controller UE 405 based at least in part on a respective sidelink. The controller UE 405 may collect the sensor and/or actuator information from various sidelink UEs for further analysis, either by the controller UE 405 and/or by another device.

As further shown by the example 400, in some sidelink modes, a network node 110 may communicate with the controller UE 405 (e.g., directly or via one or more network nodes based at least in part on a first access link 420-1. Additionally, or alternatively, in some sidelink modes, the network node 110 may communicate with the first sidelink UE 410-1 and/or the second sidelink UE 410-2 (e.g., directly or via one or more network nodes) based at least in part on a second access link 420-2 and/or a third access link 420-3, respectively. An "access link" may denote a direct link between a network node 110 and a UE 120. In some aspects, an access link may be based at least in part on a Uu. Sidelink communications may be transmitted via the sidelink, and access link communications may be transmitted via the access link. An access link communication may be either a downlink communication (from a network node 110 to a UE 120) or an uplink communication (from a UE 120 to a network node 110).

A sidelink enables two UEs to directly communicate with one another using a single wireless link. A "two-hop communication link" may denote a communication link that is based at least in part on two communication links (e.g., two wireless links). To illustrate an example of a two-hop communication link, the controller UE 405 may communicate with the first sidelink UE 410-1 based at least in part on transmitting the communication to the network node 110 using the first access link 420-1, and the network node 110 relaying the communication to the first sidelink UE 410-1 using the second access link 420-2. For instance, a communication transmitted by the first sidelink UE 410-1 may fail to reach the controller UE 405 and/or may be received with a number of recovery errors that satisfy a failure threshold. However, in other examples, the second sidelink UE 410-2 may fail to receive a communication from the controller UE 405 and/or transmit an indication of a HARQ NACK. In some aspects, the controller UE 405 may request a sidelink retransmission (e.g., a retransmission of a sidelink communication) from the first sidelink UE 410-1 and/or forward a sidelink retransmission to the second sidelink UE 410-2 based at least in part on using the two-hop communication link. That is, the controller UE 405 may request the network node 110 to relay one or more sidelink retransmissions between the controller UE 405, the first sidelink UE 410-1, and/or the second sidelink UE 410-2.

Using the network node as a relay may consume additional air interface resources and/or introduce delays relative to sidelink communications. To illustrate, a single sidelink retransmission via a two-hop communication link may be associated with multiple transmissions for each respective access link of the two-hop communication link, such as a first transmission associated with a scheduling request, a second transmission associated with an access grant, and/or a third transmission associated with the sidelink retransmission. Relative to a sidelink communication, the multiple transmissions associated with the two-hop communication link may increase signaling overhead, consume more air interface resources, increase data transfer delays, and/or reduce data throughput.

Some techniques and apparatuses described herein provide efficient scheduling of a two-hop communication link. In some aspects, a controller UE may transmit, to a network node, a relay scheduling request that indicates a request to schedule access to a Uu. The relay scheduling request may be based at least in part on a request to relay one or more sidelink retransmissions associated with at least a first sidelink between the controller UE and a first sidelink UE. In some aspects, the relay scheduling request may be associated with a request to relay multiple sidelink retransmissions that are associated with at least two different sidelinks. The controller UE may communicate the sidelink retransmissions between the controller UE and the network node based at least in part on using the Uu. As one example, the controller UE may transmit the sidelink retransmissions to the network node based at least in part on using a single aggregated retransmission communication as further described below. As another example, the controller UE may receive the one or more sidelink retransmissions from the network node based at least in part on using the single aggregated retransmission communication.

In some aspects, a network node may receive, from a controller UE, a relay scheduling request that indicates to schedule access to a Uu based at least in part on relaying one or more sidelink retransmissions associated with at least a first sidelink between the controller UE and a first sidelink UE. However, the sidelink retransmissions may be based at least in part on multiple sidelinks between the controller UE and various sidelink UEs. The network node may relay the sidelink retransmissions between at least the controller UE and at least the first sidelink UE based at least in part on the relay scheduling request. To illustrate, the network node may transmit or receive the multiple sidelink retransmissions based at least in part on a single aggregated retransmission communication.

By using a relay scheduling request, a controller UE may reduce an overhead associated with using a two-hop communication link for sidelink retransmissions. For instance, the relay scheduling request may reduce a number of scheduling request transmissions. In some aspects, a single relay scheduling request may indicate a joint scheduling request for at least a first Uu grant associated with a first access link between the controller UE to the network node, and at least a second Uu grant associated with a second access link between the network node to the first sidelink UE. Alternatively or additionally, using the relay scheduling request may reduce the number of access grant transmissions. As another example, using a single aggregated retransmission communication may reduce a number of transmissions associated with transmitting each sidelink retransmission. Reducing a number of transmissions and/or reducing an overhead associated with using the two-hop communication for sidelink retransmissions may reduce data transfer latencies, and/or increase data throughput.

As indicated above, FIG. 4 is provided as an example. Other examples may differ from what is described with respect to FIG. 4.

Figure 5:
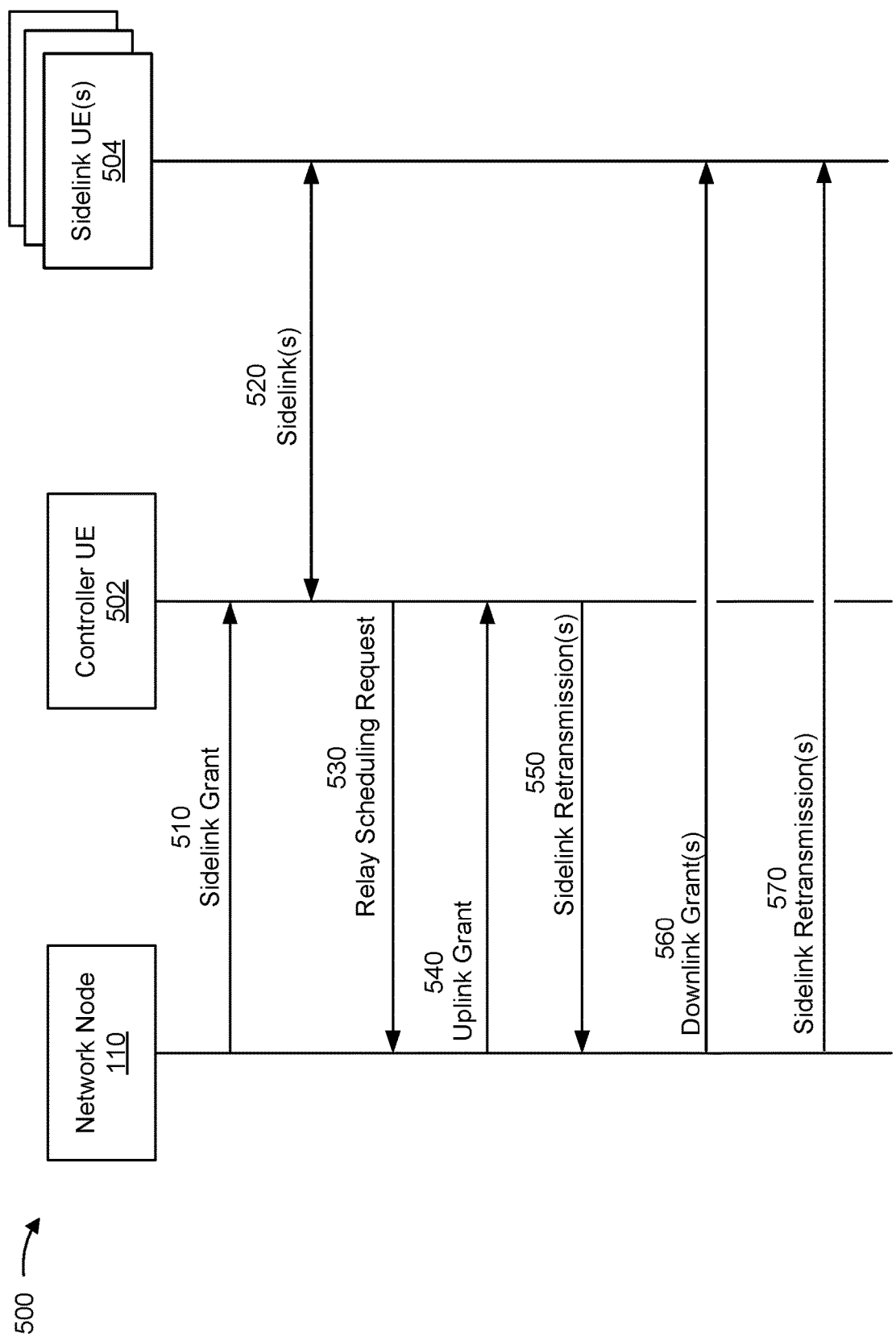
FIG. 5 is a diagram illustrating an example of a wireless communication process between a controller UE, one or more sidelink UE(s), and a network node, in accordance with the present disclosure.

FIG. 5 is a diagram illustrating an example 500 of a wireless communication process between a controller UE 502 (e.g., a UE 120), one or more sidelink UE(s) 504 (e.g., one or more other UEs 120), and a network node 110, in accordance with the present disclosure.

As shown by reference number 510, a network node 110 may transmit, and a controller UE 502 may receive, an indication of a sidelink grant. To illustrate, the controller UE 502 and the sidelink UE(s) 504 may be configured to communicate over a sidelink based at least in part on a Mode 1 communication as further described with regard to FIG. 3. In some aspects, the network node 110 may allocate one or more resources to one or more sidelinks between the controller UE and the sidelink UE(s) 504. As shown by the reference number 510, the network node 110 may indicate the sidelink grant to at least the controller UE 502 based at least in part on a Uu transmission. Alternatively or additionally, the network node 110 may indicate a sidelink grant to one or more sidelink UE(s) 504 based at least in part on another Uu transmission. Accordingly, the network node 110 may maintain a first Uu connection (e.g., a first access link) to the controller UE, a second Uu connection (e.g., a second access link) to a first sidelink UE of the sidelink UE(s) 504, and/or a third Uu connection (e.g., a third access link) to a third sidelink UE of the sidelink UE(s) 504.

The network node 110 may maintain any number of Uu connections to any number of sidelink UEs. For example, the sidelink UE(s) 504 may include at least N sidelink UEs, where N is an integer, and the network node may maintain N+1 Uu connections to the sidelink UE(s) 504 and the controller UE 502. In maintaining a Uu connection, the network node 110 may instruct the controller UE 502 and/or the sidelink UE(s) 504 to report Uu CSI (e.g., CSI that is based at least in part on the access link and/or the Uu connection). In some aspects, the network node 110 may maintain each Uu connection based at least in part on an associated CSI. To illustrate, the network node 110 may change an MCS, a carrier frequency, and/or a bandwidth part (BWP) associated with the Uu connection based at least in part on CSI.

As shown by reference number 520, the controller UE 502 may communicate with the sidelink UE(s) 504 based at least in part on the sidelink grant. As one example, the controller UE 502 may indicate, to the sidelink UE(s) 504, one or more resources to use for a sidelink communication. In some aspects, the controller UE 502 may transmit information to the sidelink UE(s) 504, such as by transmitting information to a first sidelink UE based at least in part on a first sidelink between the controller UE and the first sidelink UE and/or by transmitting information (e.g., same information or different information) to a second sidelink UE based at least in part on a second sidelink between the controller UE and the second sidelink UE. Alternatively or additionally, the controller UE 502 may receive information from the sidelink UE(s) 504 based at least in part on respective sidelink with each sidelink UE.

A sidelink and/or a sidelink communication may be associated with a sidelink HARQ process. Accordingly, the controller UE 502 may transmit a respective HARQ ACK and/or a respective HARQ NACK to one or more of the sidelink UE(s) 504 based at least in part on a respective sidelink HARQ process. Alternatively or additionally, the controller UE 502 may receive, from one or more of the sidelink UE(s) 504, a respective HARQ ACK and/or HARQ NACK associated with the sidelink HARQ process. Based at least in part on transmitting or receiving a HARQ NACK associated with the sidelink HARQ process, the controller UE 502 may determine to request that the network node 110 relay one or more sidelink retransmissions.

As shown by reference number 530, the controller UE 502 may transmit, and the network node 110 may receive, an indication of a relay scheduling request. To illustrate, the controller UE 502 may transmit the relay scheduling request based at least in part on transmitting and/or receiving at least one HARQ NACK associated with a sidelink HARQ process as further described above. Alternatively or additionally, the controller UE 502 may transmit the relay scheduling request based at least in part on a sidelink signal quality failing to satisfy a quality threshold.

The controller UE 502 may transmit the relay scheduling request based at least in part on a Uu PUCCH. For instance, the controller UE 502 may transmit the relay scheduling request based at least in part on using the Uu PUCCH to carry the relay scheduling request, such as by multiplexing the relay scheduling request on the Uu PUCCH. Alternatively or additionally, the controller UE 502 may transmit an indication of the HARQ NACK associated with the sidelink HARQ process to the network node 110. In some aspects, the network node 110 may identify the HARQ NACK as implicitly indicating a relay scheduling request.

A relay scheduling request may indicate a joint scheduling request that is associated with requesting at least two access grants for a two-hop communication link (e.g., in a single request). To illustrate, the relay scheduling request may indicate a first scheduling request for a Uu uplink grant (e.g., a single Uu uplink grant) for an uplink communication from the controller UE to the network node, and a second scheduling request for at least one Uu downlink grant for at least a first downlink communication from the network node to at least the first sidelink UE. However, the second scheduling request (e.g., indicated by the relay scheduling request) may alternatively or additionally indicate a request for multiple Uu downlink grants, such as a second downlink grant associated with a second downlink communication from the network node to a second sidelink UE and/or a third downlink grant associated with a third downlink communication from the network node to a third sidelink UE. Accordingly, the second scheduling request may indicate a request for N downlink grants associated with N respective downlink communications to the sidelink UE(s) 504. In some examples, such as that described with regard to FIG. 6, the joint scheduling request may indicate a first scheduling request for a Uu downlink grant (e.g., a single Uu downlink grant) for a downlink communication from the network node 110 to the controller UE 502 and a second scheduling request for a Uu uplink grant for at least a first uplink communication from at least one sidelink UE to the network node 110. The second scheduling request may indicate a request for multiple Uu uplink grants (e.g., for multiple sidelink UEs).

In some aspects, the relay scheduling request may be indicated by an SR based at least in part on one or more bits included in the SR. To illustrate, a relay scheduling request may be an explicit two-hop scheduling request that is different from an SR. Alternatively, an SR may indicate a relay scheduling request based at least in part on setting a bit (or multiple bits) to a value that indicates the SR is associated with relaying a sidelink retransmission. For instance, the SR may include a single bit field (e.g., a one-bit field) that indicates the SR is a relay scheduling request when set to a first value (e.g., "1") and indicates the SR is not a relay scheduling request when set to a second value (e.g., "0").

The relay scheduling request (and/or the SR when configured as a relay scheduling request) may indicate a variety of configurations associated with relaying a sidelink retransmission. As one example, the relay scheduling request may indicate an association with a logical channel, and a network node may determine resource scheduling based at least in part on the logical channel (e.g., based at least in part on a data rate, a QoS, and/or a packet loss associated with the logical channel). Alternatively or additionally, the relay scheduling request may include a scheduling request identifier field that indicates the request is associated with a relaying request. In some aspects, the relay scheduling request may indicate a size associated with a Uu grant request. To illustrate, the relay scheduling request may indicate one of multiple preconfigured packet sizes. A "preconfigured packet size" may denote a packet size that has a common definition between at least two devices, such as the network node 110 and the controller UE 502. To illustrate, the common definition may indicate that a first value (e.g., "1") in a packet size field may be associated with a 16 byte packet size, a second value (e.g., "2") in the packet size field may be associated with a 32 byte packet size, and a third value (e.g., "3") in the packet size field may be associated with a 64 byte packet size. In some aspects, the relay scheduling request may indicate a relay direction, such as a first relay direction associated with relaying a first sidelink retransmission from the controller UE to a sidelink UE and/or a second relay direction associated with relaying a second sidelink retransmission from the sidelink UE to the controller UE.

Alternatively or additionally, the controller UE 502 may transmit, prior to receiving a Uu uplink grant for transmitting the sidelink retransmissions, a buffer status report to the network node 110. The buffer status report may be transmitted separately from the relay scheduling request and/or may be included in the relay scheduling request. In some aspects, the buffer status report may indicate a relay scheduling request and/or be based at least in part on one or more sidelink retransmissions. That is, the buffer status report may be interpreted by the network node 110 as a relay scheduling request based at least in part on information included in the buffer status report. To illustrate, the buffer status report may include one or more optional parameters that, when included in the buffer status report, may indicate that the buffer status report is associated with a relay scheduling request.

For instance, the buffer status report may indicate a relay direction associated with relaying a sidelink retransmission (e.g., a controller UE-to-sidelink UE retransmission direction or a sidelink UE-to-controller UE retransmission direction). In some aspects, the buffer status report may indicate a number of UE-specific sidelink packets associated with relaying the one or more sidelink retransmissions. To illustrate, a first UE-specific sidelink packet may be based at least in part on a first sidelink retransmission associated with the first sidelink UE and a second UE-specific sidelink packet may be based at least in part on a second sidelink retransmission associated with a second sidelink UE. Accordingly, the first UE-specific sidelink packet may include one or more retransmissions specific to the first sidelink UE and the second UE-specific sidelink packet may include one or more retransmissions specific to the second sidelink UE. The buffer status report may alternatively or additionally indicate a packet size associated with a UE-specific sidelink packet. As one example, the buffer status report may indicate a respective packet size for each respective UE-specific sidelink packet associated with relaying the sidelink retransmissions. However, the buffer status report may indicate a variety of UE-specific sidelink packet information for each UE-specific sidelink packet, such as a priority associated with a UE-specific sidelink packet and/or a latency bound associated with the UE-specific sidelink packet.

Figure 6:
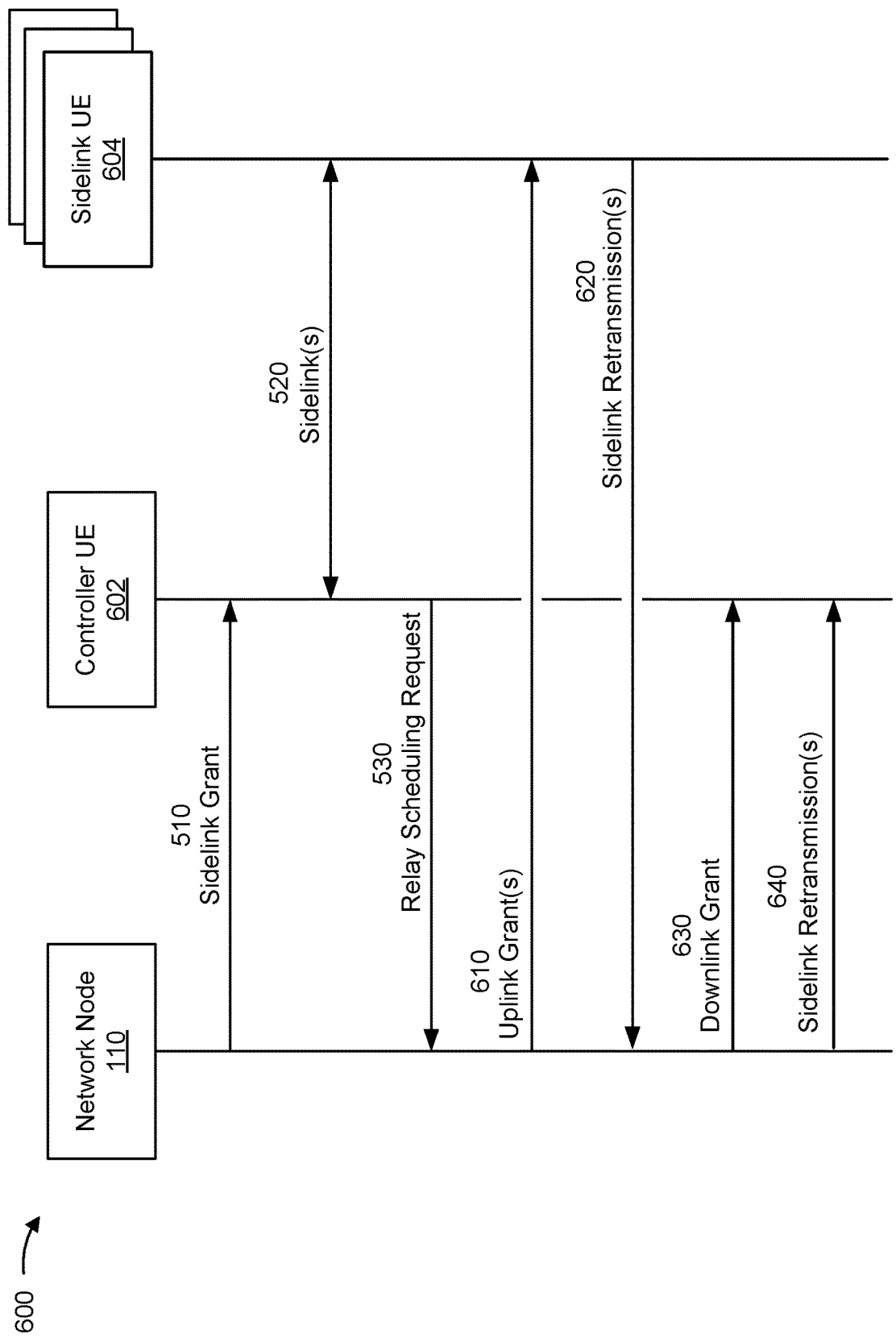
FIG. 6 is a diagram illustrating an example of a wireless communication process between a controller UE, one or more sidelink UE(s), and a network node, in accordance with the present disclosure.

In some aspects, the buffer status report may indicate a transmission size that is associated with the controller UE transmitting or receiving an aggregated retransmission communication based at least in part on a single transmission (e.g., an uplink transmission as described with regard to FIG. 5 and/or a downlink transmission as described with regard to FIG. 6). An "aggregated retransmission communication" may denote a communication that includes multiple retransmissions that are aggregated together into a single communication, such as multiple sidelink retransmissions. To illustrate, the controller UE may indicate, in a buffer status report, a transmission size associated with transmitting an aggregated retransmission communication that includes at least a first sidelink retransmission associated with a first sidelink and a second sidelink retransmission associated with a second sidelink. However, in some aspects, the controller UE may indicate a transmission size that is based at least in part on an aggregated retransmission communication that includes multiple sidelink retransmissions associated with a same sidelink.

As shown by reference number 540, the network node 110 may transmit, and the controller UE 502 may receive, a Uu uplink grant. As one example, the network node 110 may transmit an indication of the Uu uplink grant based at least in part on DCI. In some aspects, the Uu uplink grant may be a single Uu uplink grant and/or a single Uu PUSCH grant for transmitting a single aggregated retransmission communication (e.g., by the controller UE 502). That is, the Uu PUSCH grant may be based at least in part on a number of resources associated with transmitting the single aggregated retransmission communication. However, the network node 110 may transmit at least two Uu PUSCH grants (e.g., at separate times). To illustrate, the network node 110 may transmit an indication of a first Uu PUSCH grant associated with the controller UE 502 transmitting a buffer status report and a second Uu PUSCH grant that is associated with the controller UE 502 transmitting the single aggregated retransmission communication. Accordingly, the network node 110 may transmit a Uu PUSCH grant that is based at least in part on the controller UE 502 transmitting a buffer status report and/or a Uu PUSCH grant that is based at least in part on the controller UE 502 transmitting sidelink retransmissions in a single aggregated retransmission communication.

In some aspects, the Uu uplink grant may be based at least in part on a priority of a sidelink retransmission. To illustrate, the Uu uplink grant may include multiple occasions (e.g., a configured grant). In some aspects, the network node 110 may indicate (and/or the controller UE 502 may determine) that a first occasion of the Uu uplink grant is associated with a first sidelink retransmission that has a first traffic priority and a second occasion of the Uu uplink grant is associated with a second sidelink retransmission that has a second, lower traffic priority than the first traffic priority. The Uu uplink grant may be based at least in part on transmitting the higher priority sidelink retransmission before the lower priority retransmission. For instance, the Uu uplink grant may be configured such that the first occasion associated with the higher traffic priority sidelink retransmission may be scheduled to occur before the second occasion associated with the lower traffic priority sidelink retransmission.

The Uu uplink grant indicated by the network node 110 may be associated with one or more TB grants. In some aspects, each TB grant may be based at least in part on a different sidelink retransmission. For instance, the Uu uplink grant may include multiple TB grants, and the network node 110 may indicate (and/or the controller UE 502 may determine) that a first TB grant is assigned to a first sidelink retransmission (e.g., associated with a first sidelink) and that a second TB grant is assigned to a second sidelink retransmission (e.g., associated with a second, different sidelink). However, in other examples, the TB grants may be unassigned to a sidelink retransmission.

As shown by reference number 550, the controller UE 502 may transmit, and the network node 110 may receive, one or more sidelink retransmissions based at least in part on the Uu uplink grant. As one example, the controller UE 502 may transmit a single aggregated retransmission communication based at least in part on the Uu uplink grant. The single aggregated retransmission communication may include at least a first sidelink retransmission associated with the first sidelink and a second sidelink retransmission associated with the second sidelink. However, and as further described above, alternate or additional sidelink retransmissions may be included in the single aggregated retransmission communication.

The single aggregated retransmission communication may include, as the sidelink retransmissions, multiple UE-specific sidelink packets, and each UE-specific sidelink packet may be associated with a particular and/or specific sidelink UE. In some aspects, the aggregated retransmission communication may indicate sidelink retransmission information such as any combination of a number of UE-specific sidelink packets included in the single aggregated retransmission communication, a respective starting position of each respective UE-specific sidelink packet of the multiple UE-specific sidelink packets, a respective ending position of each respective UE-specific sidelink packet of the multiple UE-specific sidelink packets, and/or a respective UE identifier of each respective UE-specific sidelink packet. Alternatively or additionally, the controller UE 502 may indicate the sidelink retransmission information based at least in part on uplink control information (UCI) and/or a medium access control (MAC) control element (CE). To illustrate, the UCI may indicate one or more destination addresses of the sidelink retransmission(s) and/or the one or more UE-specific sidelink packets.

While the example 500 shows the controller UE 502 using a single uplink transmission for the sidelink retransmissions, other examples may include the controller UE 502 transmitting the sidelink transmissions based at least in part on multiple aggregated transmissions. To illustrate, the controller UE 502 may transmit a first aggregated retransmission communication in a first occasion of the Uu uplink grant and a second aggregated retransmission communication in a second occasion of the Uu uplink grant. As another example, the Uu uplink grant as described with regard to the reference number 540 may lack enough resources to transmit an entirety of the sidelink transmissions. Accordingly, the controller UE 502 may transmit a second aggregated retransmission communication based at least in part on a second Uu uplink grant.

As shown by reference number 560, the network node 110 may transmit, and the sidelink UE(s) 504 may receive, one or more Uu downlink grants. To illustrate, the network node 110 may transmit a first indication of a first Uu downlink grant (e.g., a first Uu PDSCH grant) to a first sidelink UE and a second indication of a second Uu downlink grant (e.g., a second Uu PDSCH grant) to a second sidelink UE. As an example, the network node 110 may transmit the first indication of the first Uu downlink grant and the second indication of the second Uu downlink grant based at least in part on a common group physical downlink control channel (CG-PDCCH). The network node 110 may configure each Uu downlink grant based at least in part on receiving a buffer status report from the controller UE 502, sidelink retransmission information included in an aggregated retransmission communication, and/or UCI that indicates at least some sidelink retransmission information.

As shown by reference number 570, the network node 110 may transmit, and the sidelink UE(s) 504 may receive, the sidelink retransmission(s). That is, the network node 110 may relay a sidelink retransmission from the controller UE 502 to a sidelink UE based at least in part on the Uu downlink grant(s) as described with regard to the reference number 560 and/or the relay scheduling request as described with regard to the reference number 530. In relaying the sidelink retransmission(s), the network node may relay a first sidelink retransmission (e.g., associated with the first sidelink) to the first sidelink UE and a second sidelink retransmission (e.g., associated with the second sidelink) to the second sidelink UE. While the example 500 describes the network node 110 relaying sidelink transmissions from the controller UE 502 to a sidelink UE, other examples may include the network node 110 relaying sidelink HARQ feedback (e.g., a HARQ ACK and/or a HARK NACK associated with a sidelink HARQ process) from the controller UE 502 to the sidelink UE.

By using a relay scheduling request, a controller UE may reduce an overhead associated with using a two-hop communication link for sidelink retransmissions. Reducing a number of transmissions and/or reducing an overhead associated with using the two-hop communication for sidelink retransmissions may reduce data transfer latencies, and/or increase data throughput.

As indicated above, FIG. 5 is provided as an example. Other examples may differ from what is described with regard to FIG. 5.

FIG. 6 is a diagram illustrating an example 600 of a wireless communication process between a controller UE 602 (e.g., a UE 120), one or more sidelink UE(s) 604 (e.g., one or more other UEs 120), and a network node 110, in accordance with the present disclosure.

As shown by the reference number 510, and as further described with regard to FIG. 5, a network node 110 may transmit, and a controller UE 602 may receive, an indication of a sidelink grant that is based at least in part on sidelink(s) between the controller UE 602 and the sidelink UE(s) 604. As shown by reference number 520, and as further described with regard to FIG. 5, the controller UE 602 may communicate with the sidelink UE(s) 604 based at least in part on the sidelink grant.

As shown by reference number 530, and as further described with regard to FIG. 5, the controller UE 602 may transmit, and the network node 110 may receive, an indication of a relay scheduling request. In some aspects, and as shown by the example 600, the relay scheduling request may indicate a joint scheduling request that is associated with a Uu downlink grant request (e.g., a single Uu downlink grant request) for a downlink communication from the network node 110 to the controller UE 602, and one or more Uu uplink grant requests associated with at least one uplink communication from at least a first sidelink UE of the sidelink UE(s) 604 to the network node 110. The joint scheduling request may indicate multiple Uu uplink grant requests that are each associated with a respective sidelink UE of the sidelink UE(s) 604. For instance, the joint scheduling request may indicate a first Uu PUSCH grant request associated with a first sidelink retransmission from the first sidelink UE and a second PUSCH grant request associated with a second sidelink retransmission from the second sidelink UE. Alternatively or additionally, the joint scheduling request may indicate a Uu PDSCH grant request for an aggregated retransmission communication from the network node 110 to the controller UE 602.

As shown by reference number 610, the network node 110 may transmit, and the one or more sidelink UE(s) 604 may receive, one or more Uu uplink grants. To illustrate, the network node 110 may indicate a first Uu PUSCH grant to the first sidelink UE and/or a second Uu PUSCH grant to the second sidelink UE. The network node 110 may transmit a first indication of the first Uu PUSCH grant and a second indication of the second Uu PUSCH grant based at least in part on using a CG-PDCCH.

As shown by reference number 620, the sidelink UE(s) 604 may transmit, and the network node 110 may receive, one or more sidelink retransmissions based at least in part on the Uu uplink grant(s). For example, the network node 110 may receive the first sidelink retransmission from the first sidelink UE based at least in part on the first Uu PUSCH grant and/or the second sidelink retransmission from the second sidelink UE based at least in part on the second Uu PUSCH grant.

As shown by reference number 630, the network node 110 may transmit, and the controller UE 602 may receive, a Uu downlink grant. In some aspects, the Uu downlink grant is a single Uu downlink grant associated with transmitting and/or receiving an aggregated retransmission communication, such as an aggregated retransmission communication that includes at least the first sidelink retransmission and the second sidelink retransmission. Accordingly, the network node 110 may configure the Uu downlink grant based at least in part on transmitting an aggregated retransmission communication. However, and as further described above, the aggregated retransmission communication may include at least N sidelink retransmissions based at least in part on N sidelink UEs (where N is an integer).

As shown by reference number 640, the network node 110 may transmit, and the controller UE 602 may receive, the sidelink retransmission(s). For example, the network node 110 may generate a single aggregated retransmission communication that includes at least the first sidelink retransmission and the second sidelink retransmission as further described above, and transmit the single aggregated retransmission communication in a single downlink transmission. The single downlink transmission may be based at least in part on the Uu downlink grant (e.g., a single downlink grant). In some aspects, the network node 110 may indicate sidelink retransmission information to the controller UE 602 based at least in part on a MAC CE. That is, at least some sidelink retransmission information may be indicated by and/or included in the MAC CE. Alternatively or additionally, the network node 110 may indicate the sidelink retransmission information in the single aggregated retransmission communication. While the example 600 describes the network node 110 relaying a sidelink transmission from a sidelink UE to the controller UE 502, other examples may include the network node 110 relaying sidelink HARQ feedback (e.g., a HARQ ACK and/or a HARK NACK associated with a sidelink HARQ process) from the sidelink UE to the controller UE 502.

By using a relay scheduling request, a controller UE may reduce an overhead associated with using a two-hop communication link for sidelink retransmissions. Reducing a number of transmissions and/or reducing an overhead associated with using the two-hop communication for sidelink retransmissions may reduce data transfer latencies, and/or increase data throughput.

As indicated above, FIG. 6 is provided as an example. Other examples may differ from what is described with regard to FIG. 6.

FIGS. 7A and 7B are diagrams illustrating a first example 700 of a first wireless communication process and a second example 705 of a second wireless communication process between a network node (e.g., the network node 110) and a controller UE 120 (e.g., the controller UE 502, the controller UE 602, and/or the UE 120), in accordance with the present disclosure. Aspects of the first example 700 and/or the second example 705 may be used in combination with aspects of the example 500 as described with regard to FIG. 5 and/or the example 600 as described with regard to FIG. 6.

As shown by the first example 700, a controller UE 120 may transmit, and a network node 110 may receive, one or more sidelink retransmissions as further described with regard to the reference number 550. To illustrate, the controller UE 120 may transmit the sidelink retransmissions based at least in part on a single aggregated retransmission communication.

As shown by reference number 710, the network node 110 may transmit, and the controller UE 120 may receive, a retransmission indication that requests a retransmission of at least one of the sidelink retransmissions. As one example, the network node 110 may transmit HARQ feedback (e.g., a HARQ NACK) that is associated with a retransmission HARQ process. That is, the retransmission HARQ process may be associated with the transmission and reception of a single aggregated retransmission communication. As another example, the network node 110 may signal an indication to retransmit at least a portion of the aggregated retransmission communication (e.g., a portion of the sidelink retransmissions). As one example, the network node 110 may indicate to retransmit one or more UE-specific sidelink retransmissions (e.g., a UE-specific portion of the aggregated retransmission communication) associated with a particular sidelink UE. Alternatively or additionally, the network node 110 may indicate to retransmit an entirety of the one or more sidelink retransmissions and/or an entirety of the single aggregated retransmission communication.

As shown by reference number 720, the controller UE 120 may retransmit, and the network node 110 may receive, a sidelink retransmission. To illustrate, the controller UE 120 may retransmit an entirety of the single aggregated retransmission communication. Alternatively, the controller UE 120 may retransmit a UE-specific portion of the single aggregated retransmission communication and/or a UE-specific sidelink retransmission.

As shown by the second example 705, a network node 110 may transmit, and a controller UE 120 may receive, one or more sidelink retransmissions as further described with regard to the reference number 640. To illustrate, the network node 110 may transmit the sidelink retransmissions based at least in part on a single aggregated retransmission communication.

As shown by reference number 730, the controller UE 120 may transmit, and the network node 110 may receive, a retransmission indication that requests a retransmission of at least one of the sidelink retransmissions. For example, the controller UE 120 may transmit HARQ feedback (e.g., a HARQ NACK) that is associated with a retransmission HARQ process. Alternatively or additionally, the controller UE 502 may signal an indication to retransmit at least a portion of the aggregated retransmission communication (e.g., a portion of the sidelink retransmissions) or an entirety of the aggregated retransmission communication. To illustrate, the controller UE 120 may indicate, to the network node 110, to retransmit one or more UE-specific sidelink retransmissions associated with a particular sidelink UE.

As shown by reference number 740, the network node 110 may retransmit, and the controller UE 120 may receive, at least one sidelink retransmission. As further described above, the network node 110 may retransmit an entirety of the single aggregated retransmission communication, a UE-specific portion of the single aggregated retransmission communication and/or a UE-specific sidelink retransmission.

By transmitting a retransmission indication, a controller UE and/or a network node may request a retransmission of a sidelink retransmission (e.g., transmitted based at least in part on a two-hop communication link) that may have been received with errors and/or may have not been received. The retransmission indication may improve sidelink communications by providing a mechanism to obtain a missing sidelink retransmission and/or a sidelink retransmission with fewer errors.

As indicated above, FIGS. 7A and 7B are provided as examples. Other examples may differ from what is described with regard to FIGS. 7A and 7B.

FIGS. 8A, 8B, and 8C are diagrams illustrating a first example 800 of a buffer status report, a second example 802 of an uplink aggregated retransmission communication, and a third example 804 of a downlink aggregated retransmission communication, in accordance with the present disclosure.

As shown by the first example 800, a buffer status report may indicate information that is associated with one or more sidelink retransmissions as further described above. In some aspects, a buffer status report may include UE-specific information for a respective UE-specific sidelink packet and/or a respective sidelink retransmission.

To illustrate, and as shown by the first example 800, a buffer status report may include at least a first relay direction field 806-1 and/or a second direction field 806-2 that each indicate a Uu relay direction associated with a sidelink retransmission (e.g., "T" indicating the sidelink retransmission may be transmitted by a controller UE and/or "R" indicating the sidelink retransmission may be received by the controller UE). Each relay direction field may be associated with a respective UE-specific sidelink packet (and/or a respective sidelink retransmission). Alternatively or additionally, a buffer status report may include at least a first logical channel group (LCG) identifier (ID) field 808-1 and/or a second LCG ID field 808-2 that each indicate a respective LCG associated with a respective UE-specific sidelink packet.

In some aspects, a buffer status report may indicate, for each respective UE-specific sidelink packet, a destination and/or source identifier (ID), shown by the first example 800 as address field 810-1 and address field 810-2. The buffer status report may include at least a first buffer size field 812-2 and/or a second buffer size field 812-2 that indicates a buffer size of each respective UE-specific sidelink packet. While the example 800 shows the buffer status report indicating UE-specific information associated with two UE-specific sidelink packets (and/or two UE-specific sidelink retransmissions), other examples may include a buffer status report that indicates UE-specific information associated with more or fewer UE-specific sidelink packets.

An uplink aggregated retransmission communication as shown by the second example 802 may be transmitted by a controller UE, such as that described with regard to FIG. 5. As one example, the controller UE may transmit the uplink aggregated retransmission communication based at least in part on a PUSCH grant from a network node. In some aspects, the uplink aggregated retransmission communication may include sidelink retransmission information.

To illustrate, the uplink aggregated retransmission communication shown by the second example 802 may include UCI 814 that indicates any combination of sidelink retransmission information, such as, by way of example and not of limitation, a number of UE-specific sidelink packets included in the uplink aggregated retransmission communication, a respective starting position of each respective UE-specific sidelink packet of the multiple UE-specific sidelink packets (e.g., within the uplink aggregated retransmission communication), a respective ending position of each respective UE-specific sidelink packet of the multiple UE-specific sidelink packets (e.g., within the uplink aggregated retransmission communication), and/or a respective UE identifier of a specific sidelink UE associated with the respective UE-specific sidelink packet.

The uplink aggregated retransmission communication may include any number of UE-specific packets and/or any number of UE-specific sidelink retransmissions. To illustrate, the uplink aggregated retransmission communication may include a first UE-specific packet 816 (shown by a diagonal line hash pattern), a second UE-specific packet 818 (shown by a dotted hash pattern), and/or a third UE-specific packet 820 (shown by a vertical line hash pattern). In some aspects, a UE-specific packet may differ in size from another UE-specific packet and/or have a same size. That is, each UE-specific packet included in the uplink aggregated retransmission communication may include a different number of sidelink retransmissions and/or include a sidelink retransmission that has a different data size. While the example 802 shows the uplink aggregated retransmission communication including three UE-specific sidelink packets (and/or three UE-specific sidelink retransmissions), other examples may include an uplink aggregated retransmission communication that includes more or fewer UE-specific sidelink packets.

A downlink aggregated retransmission communication as shown by the third example 804 may be transmitted by a network node, such as that described with regard to FIG. 6. As one example, the network node may transmit the downlink aggregated retransmission communication based at least in part on a Uu PDSCH grant to a controller UE. In some aspects, the downlink aggregated retransmission communication may include sidelink retransmission information.

To illustrate, the downlink aggregated retransmission communication shown by the third example 804 may include a MAC CE 822 that indicates any combination of sidelink retransmission information, such as, by way of example and not of limitation, a number of UE-specific sidelink packets included in the downlink aggregated retransmission communication, a respective starting position of each respective UE-specific sidelink packet of the multiple UE-specific sidelink packets (e.g., within the downlink aggregated retransmission communication), a respective ending position of each respective UE-specific sidelink packet of the multiple UE-specific sidelink packets (e.g., within the downlink aggregated retransmission communication), and/or a respective UE identifier of a specific sidelink UE associated with the respective UE-specific sidelink packet.

The downlink aggregated retransmission communication may include any number of UE-specific packets and/or any number of UE-specific sidelink retransmissions. To illustrate, the downlink aggregated retransmission communication may include a first UE-specific packet 824 (shown by a diagonal line hash pattern), a second UE-specific packet 826 (shown by a dotted hash pattern), and/or a third UE-specific packet 828 (shown by a vertical line hash pattern). In some aspects, a UE-specific packet may differ in size from another UE-specific packet and/or have a same size. That is, each UE-specific packet included in the downlink aggregated retransmission communication may include a different number of sidelink retransmissions and/or include a sidelink retransmission that has a different data size. While the example 804 shows the downlink aggregated retransmission communication including three UE-specific sidelink packets (and/or three UE-specific sidelink retransmissions), other examples may include a downlink aggregated retransmission communication that includes more or fewer UE-specific sidelink packets.

As indicated above, FIGS. 8A, 8B, and 8C are provided as examples. Other examples may differ from what is described with regard to FIGS. 8A, 8B, and 8C.

Figure 9:
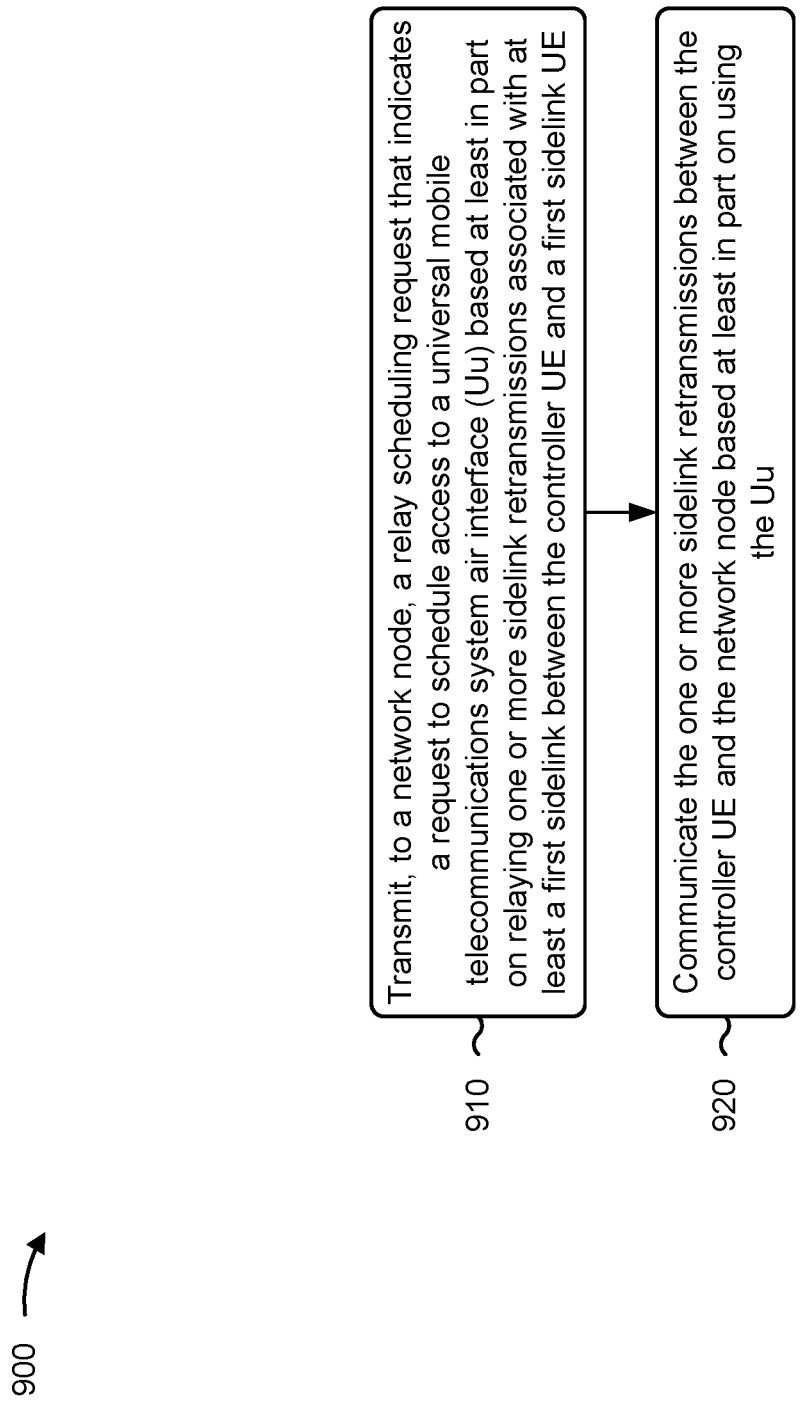
FIG. 9 is a diagram illustrating an example process performed, for example, by a controller UE, in accordance with the present disclosure.

FIG. 9 is a diagram illustrating an example process 900 performed, for example, by a controller UE, in accordance with the present disclosure. Example process 900 is an example where the controller UE (e.g., the UE 120, the controller UE 502, and/or the controller UE 602) performs operations associated with efficient scheduling of a two-hop communication link.

As shown in FIG. 9, in some aspects, process 900 may include transmitting, to a network node, a relay scheduling request that indicates a request to schedule access to a Uu based at least in part on relaying one or more sidelink retransmissions associated with at least a first sidelink between the controller UE and a first sidelink UE (block 910). For example, the controller UE (e.g., using communication manager 140 and/or transmission component 1104, depicted in FIG. 11) may transmit, to a network node, a relay scheduling request that indicates a request to schedule access to a Uu based at least in part on relaying one or more sidelink retransmissions associated with at least a first sidelink between the controller UE and a first sidelink UE, as described above.

As further shown in FIG. 9, in some aspects, process 900 may include communicating the one or more sidelink retransmissions between the controller UE and the network node based at least in part on using the Uu (block 920). For example, the controller UE (e.g., using communication manager 140 and/or a sidelink retransmission manager component 1108, depicted in FIG. 11) may communicate the one or more sidelink retransmissions between the controller UE and the network node based at least in part on using the Uu, as described above.

Process 900 may include additional aspects, such as any single aspect or any combination of aspects described below and/or in connection with one or more other processes described elsewhere herein.

In a first aspect, the relay scheduling request indicates a Uu uplink grant request between the controller UE and the network node, and communicating the one or more sidelink retransmissions includes transmitting, to the network node, the one or more sidelink retransmissions using a Uu uplink grant that is based at least in part on the Uu uplink grant request.

In a second aspect, the one or more sidelink retransmissions include at least a first sidelink retransmission associated with the first sidelink between the controller UE and the first sidelink UE, and a second sidelink retransmission associated with a second sidelink between the controller UE and a second sidelink UE.

In a third aspect, communicating the one or more sidelink retransmissions based at least in part on the Uu uplink grant includes transmitting the one or more sidelink retransmissions based at least in part on a single aggregated retransmission communication.

In a fourth aspect, the Uu uplink grant is based at least in art on a PUSCH grant.

In a fifth aspect, the single aggregated retransmission communication includes multiple UE-specific sidelink packets, each UE-specific sidelink packet is associated with a particular sidelink UE, and process 900 includes indicating sidelink retransmission information associated with the single aggregated retransmission communication. In some aspects, the sidelink retransmission information includes at least one of: a number of UE-specific sidelink packets included in the single aggregated retransmission communication, a respective starting position of each respective UE-specific sidelink packet of the multiple UE-specific sidelink packets, a respective ending position of each respective UE-specific sidelink packet of the multiple UE-specific sidelink packets, or a respective UE identifier of each respective UE-specific sidelink packet.

In a sixth aspect, indicating the sidelink retransmission information includes indicating the sidelink retransmission information based at least in part on using at least one of uplink control information, or a MAC CE.

In a seventh aspect, communicating the one or more sidelink retransmissions based at least in part on the Uu uplink grant includes transmitting the one or more sidelink retransmissions using multiple aggregated transmissions.

In an eighth aspect, the relay scheduling request indicates a joint scheduling request associated with a first scheduling request for a Uu uplink grant associated with an uplink communication from the controller UE to the network node, and a second scheduling request for at least one Uu downlink grant associated with at least a first downlink communication from the network node to at least the first sidelink UE.

In a ninth aspect, the joint scheduling request is further associated with at least a second Uu downlink grant associated with a third communication from the network node to a second sidelink UE.

In a tenth aspect, the relay scheduling request is an explicit two-hop scheduling request.

In an eleventh aspect, transmitting the relay scheduling request includes multiplexing the relay scheduling request on a Uu PUCCH.

In a twelfth aspect, transmitting the relay scheduling request includes transmitting the relay scheduling request based at least in part on a sidelink HARQ process.

In a thirteenth aspect, process 900 includes transmitting a HARQ negative acknowledgement associated with the sidelink HARQ process.

In a fourteenth aspect, process 900 includes setting at least one bit that is associated with a scheduling request to a value that indicates the scheduling request is associated with relaying the one or more sidelink retransmissions.

In a fifteenth aspect, process 900 includes receiving a Uu PUSCH grant associated with transmitting at least a buffer status report that is based at least in part on the one or more sidelink retransmissions.

In a sixteenth aspect, the Uu PUSCH grant is further associated with transmitting the one or more sidelink retransmissions.

In a seventeenth aspect, process 900 includes receiving a Uu uplink grant that is based at least in part on a priority of at least one sidelink retransmission of the one or more sidelink retransmissions.

In an eighteenth aspect, the Uu uplink grant is based at least in part on multiple occasions, a first occasion of the multiple occasions is associated with a first sidelink retransmission configured with a first traffic priority, a second occasion of the multiple occasions is associated with a second sidelink retransmission configured with a second traffic priority that is lower than the first traffic priority, and the first occasion occurs before the second occasion.

In a nineteenth aspect, process 900 includes receiving a Uu uplink grant based at least in part on DCI, and the Uu uplink grant is associated with one or more TB grants.

In a twentieth aspect, the one or more TB grants include at least a first TB grant associated with a first sidelink retransmission that is based at least in part on the first sidelink between the controller UE and the first sidelink UE, and a second TB grant associated with a second sidelink retransmission that is based at least in part on a second sidelink between the controller UE and a second sidelink UE.

In a twenty-first aspect, communicating the one or more sidelink retransmissions includes transmitting, based at least in part on the Uu uplink grant, at least an aggregated retransmission communication that includes the one or more sidelink retransmissions, and uplink control information that indicates one or more destination addresses of the one or more sidelink retransmissions.

In a twenty-second aspect, process 900 includes transmitting, prior to receiving the Uu uplink grant, a buffer status report that indicates a transmission size associated with transmitting the aggregated retransmission communication.

In a twenty-third aspect, the relay scheduling request is associated with a logical channel.

In a twenty-fourth aspect, the relay scheduling request includes a scheduling request identifier field that indicates a relaying request.

In a twenty-fifth aspect, the scheduling request identifier field is a one-bit field.

In a twenty-sixth aspect, the relay scheduling request indicates one of multiple preconfigured packet sizes.

In a twenty-seventh aspect, the relay scheduling request indicates a relay direction.

In a twenty-eighth aspect, process 900 includes transmitting a buffer status report that indicates at least one of a relay direction associated with relaying the one or more sidelink retransmissions, a number of UE-specific sidelink packets associated with relaying the one or more sidelink retransmissions, a packet size associated with a UE-specific sidelink packet, a priority associated with the UE-specific sidelink packet, or a latency bound associated with the UE-specific sidelink packet.

In a twenty-ninth aspect, process 900 includes receiving a retransmission indication that specifies to retransmit at least a portion of the one or more sidelink retransmissions.

In a thirtieth aspect, the retransmission indication specifies to retransmit an entirety of the one or more sidelink retransmissions.

In a thirty-first aspect, the retransmission indication specifies to retransmit a UE-specific portion of the one or more sidelink retransmissions.

In a thirty-second aspect, the relay scheduling request indicates a Uu downlink grant request associated with the controller UE, and communicating the one or more sidelink retransmissions includes receiving, based at least in part on the Uu downlink grant request, the one or more sidelink retransmissions from the network node.

In a thirty-third aspect, the one or more sidelink retransmissions comprise at least a first sidelink retransmission associated with the first sidelink between the controller UE and the first sidelink UE, and a second sidelink retransmission associated with a second sidelink between the controller UE and a second sidelink UE.

In a thirty-fourth aspect, receiving the one or more sidelink retransmissions includes receiving the one or more sidelink retransmissions in a single aggregated retransmission communication.

In a thirty-fifth aspect, the relay scheduling request indicates at least a first PUSCH grant request associated with a first uplink transmission between the first sidelink UE and the network node, and a second PUSCH grant request associated with a second uplink transmission between the second sidelink UE and the network node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
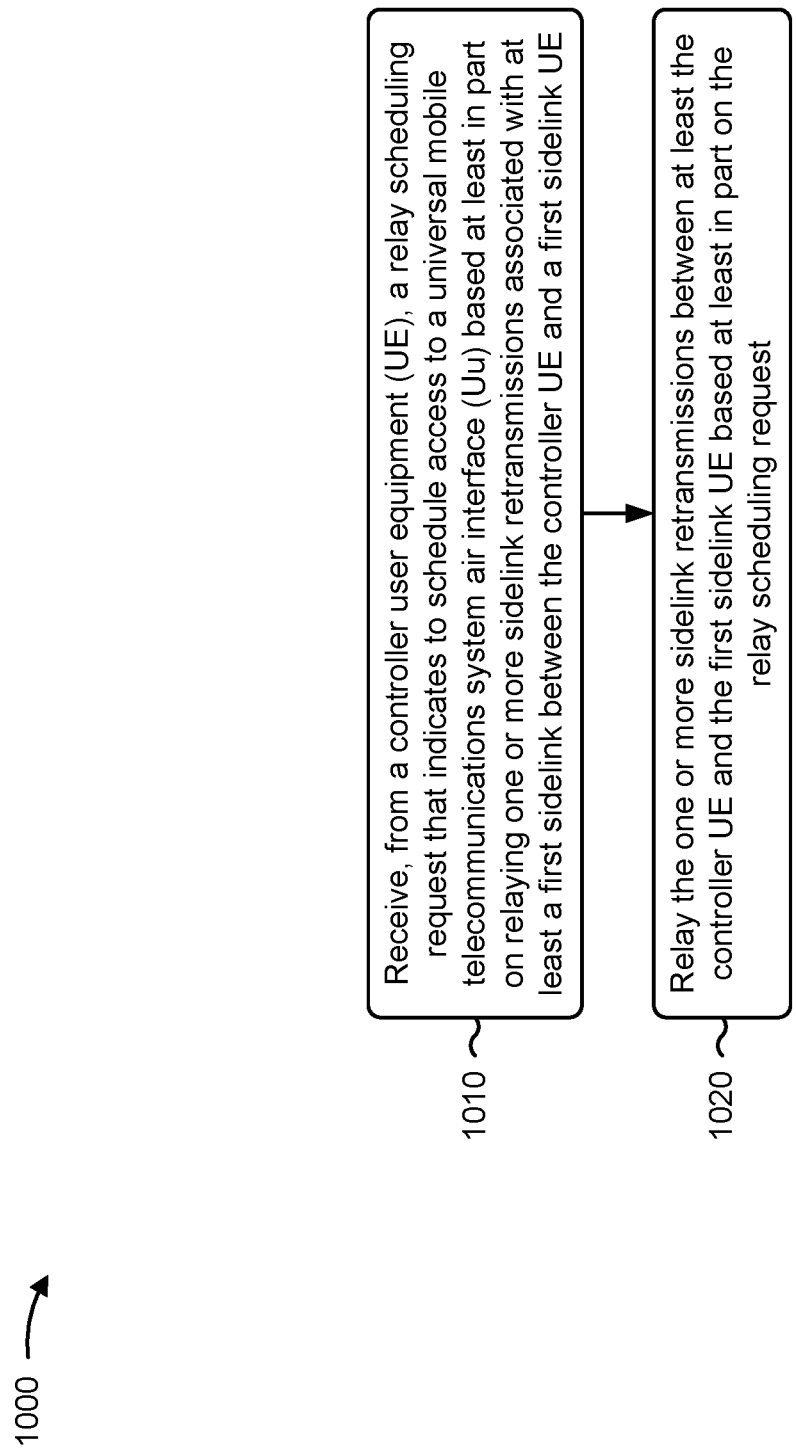
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110 performs operations associated with efficient scheduling of a two-hop communication link.

As shown in FIG. 10, in some aspects, process 1000 may include receiving, from a controller UE, a relay scheduling request that indicates to schedule access to a Uu based at least in part on relaying one or more sidelink retransmissions associated with at least a first sidelink between the controller UE and a first sidelink UE (block 1010). For example, the network node (e.g., using communication manager 150 and/or reception component 1202, depicted in FIG. 12) may receive, from a controller UE, a relay scheduling request that indicates to schedule access to a Uu based at least in part on relaying one or more sidelink retransmissions associated with at least a first sidelink between the controller UE and a first sidelink UE, as described above.

As further shown in FIG. 10, in some aspects, process 1000 may include relaying the one or more sidelink retransmissions between at least the controller UE and the first sidelink UE based at least in part on the relay scheduling request (block 1020). For example, the network node (e.g., using communication manager 150 and/or a sidelink retransmission manager component 1208, depicted in FIG. 12) may relay the one or more sidelink retransmissions between at least the controller UE and the first sidelink UE based at least in part on the relay scheduling request, as described above.

Process 1000 may include additional aspects, such as any single aspect or any combination of aspects described below and/or in connection with one or more other processes described elsewhere herein.

In a first aspect, the relay scheduling request indicates a Uu uplink grant request between the controller UE and the network node, and relaying the one or more sidelink retransmissions includes receiving, based at least in part on a Uu uplink grant, the one or more sidelink retransmissions from the controller UE, and transmitting, based at least in part on at least one Uu downlink grant, the one or more sidelink retransmissions to at least the first sidelink UE.

In a second aspect, the one or more sidelink retransmissions comprise at least a first sidelink retransmission associated with the first sidelink between the controller UE and the first sidelink UE, and a second sidelink retransmission associated with a second sidelink between the controller UE and a second sidelink UE.

In a third aspect, the at least one UU downlink grant includes a first Uu downlink grant and a second Uu downlink grant, and transmitting the one or more sidelink retransmissions to at least the first sidelink UE includes transmitting, based at least in part on the first Uu downlink grant, the first sidelink retransmission to the first sidelink UE, and transmitting, based at least in part on the second Uu downlink grant, the second sidelink retransmission to the second sidelink UE.

In a fourth aspect, the first Uu downlink grant includes a first Uu PDSCH grant, and the second Uu downlink grant includes a second Uu PDSCH grant.

In a fifth aspect, process 1000 includes indicating the first Uu PDSCH grant to the first sidelink UE and the second Uu PDSCH grant to the second sidelink UE based at least in part on a CG-PDCCH.

In a sixth aspect, at least one of the first Uu PDSCH grant and the second Uu PDSCH grant is based at least in part on at least one of a buffer status report from the controller UE, or uplink control information that indicates sidelink retransmission information.

In a seventh aspect, receiving the one or more sidelink retransmissions includes receiving the one or more sidelink retransmissions as a single aggregated retransmission communication.

In an eighth aspect, receiving the one or more sidelink retransmissions as the single aggregated retransmission communication includes receiving the single aggregated retransmission communication based at least in part on a single Uu PUSCH grant.

In a ninth aspect, the single aggregated retransmission communication includes multiple UE-specific sidelink packets, and process 1000 includes receiving sidelink retransmission information associated with the single aggregated retransmission communication, the sidelink retransmission information comprising at least one of a number of UE-specific sidelink packets included in the single aggregated retransmission communication, a respective starting position of each respective UE-specific sidelink packet of the multiple UE-specific sidelink packets, a respective ending position of each respective UE-specific sidelink packet of the multiple UE-specific sidelink packets, or a respective UE identifier of each respective UE-specific sidelink packet.

In a tenth aspect, receiving the sidelink retransmission information includes receiving the sidelink retransmission information based at least in part on using at least one of uplink control information, or a MAC CE.

In an eleventh aspect, the relay scheduling request indicates a joint scheduling request associated with a first scheduling request for at least one Uu uplink grant from the controller UE to the network node, and a second scheduling request for at least one Uu downlink grant from the network node to the first sidelink UE.

In a twelfth aspect, the relay scheduling request is an explicit two-hop scheduling request.

In a thirteenth aspect, receiving the relay scheduling request includes receiving the relay scheduling request based at least in part on a Uu PUCCH.

In a fourteenth aspect, receiving the relay scheduling request includes receiving the relay scheduling request based at least in part on a sidelink HARQ process.

In a fifteenth aspect, receiving the relay scheduling request includes receiving the relay scheduling request based at least in part on a HARQ negative acknowledgement associated with the sidelink HARQ process.

In a sixteenth aspect, the relay scheduling request is based at least in part on a first bit of multiple bits that are associated with a scheduling request, the first bit indicates a value that is associated with a request to relay the one or more sidelink retransmissions.

In a seventeenth aspect, process 1000 includes transmitting a Uu PUSCH grant associated with transmitting at least a buffer status report that is based at least in part on the one or more sidelink retransmissions.

In an eighteenth aspect, the Uu PUSCH grant is further associated with transmitting the one or more sidelink retransmissions.

In a nineteenth aspect, process 1000 includes transmitting a Uu uplink grant that is based at least in part on a priority of at least one sidelink retransmission of the one or more sidelink retransmissions.

In a twentieth aspect, the Uu uplink grant is based at least in part on multiple occasions, a first occasion of the multiple occasions is associated with a first sidelink retransmission configured with a first traffic priority, a second occasion of the multiple occasions is associated with a second sidelink retransmission configured with a second traffic priority that is lower than the first traffic priority, and the first occasion occurs before the second occasion.

In a twenty-first aspect, process 1000 includes transmitting, based at least in part on DCI, a Uu uplink grant that is associated with one or more TB grants.

In a twenty-second aspect, the one or more TB grants include at least a first TB grant associated with a first sidelink retransmission that is based at least in part on the first sidelink between the controller UE and the first sidelink UE, and a second TB grant associated with a second sidelink retransmission that is based at least in part on a second sidelink between the controller UE and a second sidelink UE.

In a twenty-third aspect, relaying the one or more sidelink retransmissions includes receiving, from the controller UE and based at least in part on the Uu uplink grant an aggregated retransmission communication that includes the one or more sidelink retransmissions, and uplink control information that indicates one or more destination addresses of the one or more sidelink retransmissions.

In a twenty-fourth aspect, process 1000 includes receiving, prior to transmitting the Uu uplink grant, a buffer status report that indicates a transmission size associated with transmitting the aggregated retransmission communication.

In a twenty-fifth aspect, the relay scheduling request is associated with a logical channel.

In a twenty-sixth aspect, the relay scheduling request includes a scheduling request identifier field that indicates a relaying request.

In a twenty-seventh aspect, the scheduling request identifier field is a one-bit field.

In a twenty-eighth aspect, the relay scheduling request indicates one of multiple preconfigured packet sizes.

In a twenty-ninth aspect, the relay scheduling request indicates a relay direction.

In a thirtieth aspect, process 1000 includes receiving a buffer status report that indicates at least one of a relay direction associated with relaying the one or more sidelink retransmissions, a number of UE-specific sidelink packets associated with relaying the one or more sidelink retransmissions, a packet size associated with a UE-specific sidelink packet, a priority associated with the UE-specific sidelink packet, or a latency bound associated with the UE-specific sidelink packet.

In a thirty-first aspect, process 1000 includes transmitting a retransmission indication that specifies to retransmit at least a portion of the one or more sidelink retransmissions.

In a thirty-second aspect, the retransmission indication specifies to retransmit an entirety of the one or more sidelink retransmissions.

In a thirty-third aspect, the retransmission indication specifies to retransmit a UE-specific portion of the one or more sidelink retransmissions.

In a thirty-fourth aspect, the relay scheduling request indicates a Uu downlink grant request associated with the controller UE, and relaying the one or more sidelink retransmissions includes transmitting, to the controller UE and based at least in part on the Uu downlink grant request, the one or more sidelink retransmissions.

In a thirty-fifth aspect, process 1000 includes indicating, to the controller UE, sidelink retransmission information based at least in part on using a MAC CE.

In a thirty-sixth aspect, the one or more sidelink retransmissions comprise at least a first sidelink retransmission from the first sidelink UE to the controller UE, and a second sidelink retransmission from a second sidelink UE to the controller UE.

In a thirty-seventh aspect, the relay scheduling request indicates at least a first Uu PUSCH grant request associated with a first uplink transmission between the first sidelink UE and the network node, and a second Uu PUSCH grant request associated with a second uplink transmission between the second sidelink UE and the network node.

In a thirty-eighth aspect, process 1000 includes indicating, based at least in part on the first Uu PUSCH grant request, a first Uu PUSCH grant to the first sidelink UE, and indicating, based at least in part on the second Uu PUSCH grant request, a second Uu PUSCH grant to the second sidelink UE.

In a thirty-ninth aspect, indicating the first Uu PUSCH grant and indicating the second Uu PUSCH grant includes transmitting a first indication of the first Uu PUSCH grant and a second indication of the second Uu PUSCH grant based at least in part on using a CG-PDCCH.

In a fortieth aspect, relaying the one or more sidelink retransmissions includes receiving the first sidelink retransmission from the first sidelink UE based at least in part on the first Uu PUSCH grant, and receiving the second sidelink retransmission from the second sidelink UE based at least in part on the second Uu PUSCH grant.

In a forty-first aspect, process 1000 includes generating an aggregated retransmission communication that includes the first sidelink retransmission with the second sidelink retransmission, and transmitting the one or more sidelink retransmissions includes transmitting the aggregated retransmission communication to the controller UE based at least in part on a single UU downlink grant.

In a forty-second aspect, process 1000 includes maintaining a first Uu connection to the controller UE based at least in part on first Uu CSI associated with the first Uu connection, and maintaining a second Uu connection to a second sidelink UE based at least in part on second CSI associated with the second Uu connection.

In a forty-third aspect, process 1000 includes relaying a retransmission HARQ ACK between at least the controller UE and the first sidelink UE.

In a forty-fourth aspect, process 1000 includes receiving a retransmission HARQ NACK, and retransmitting at least a portion of the one or more sidelink retransmissions.

In a forty-fifth aspect, retransmitting at least a portion of the one or more sidelink retransmissions includes retransmitting an entirety of the one or more sidelink retransmissions.

In a forty-sixth aspect, retransmitting at least a portion of the one or more sidelink retransmissions includes retransmitting a UE-specific portion of the one or more sidelink retransmissions.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
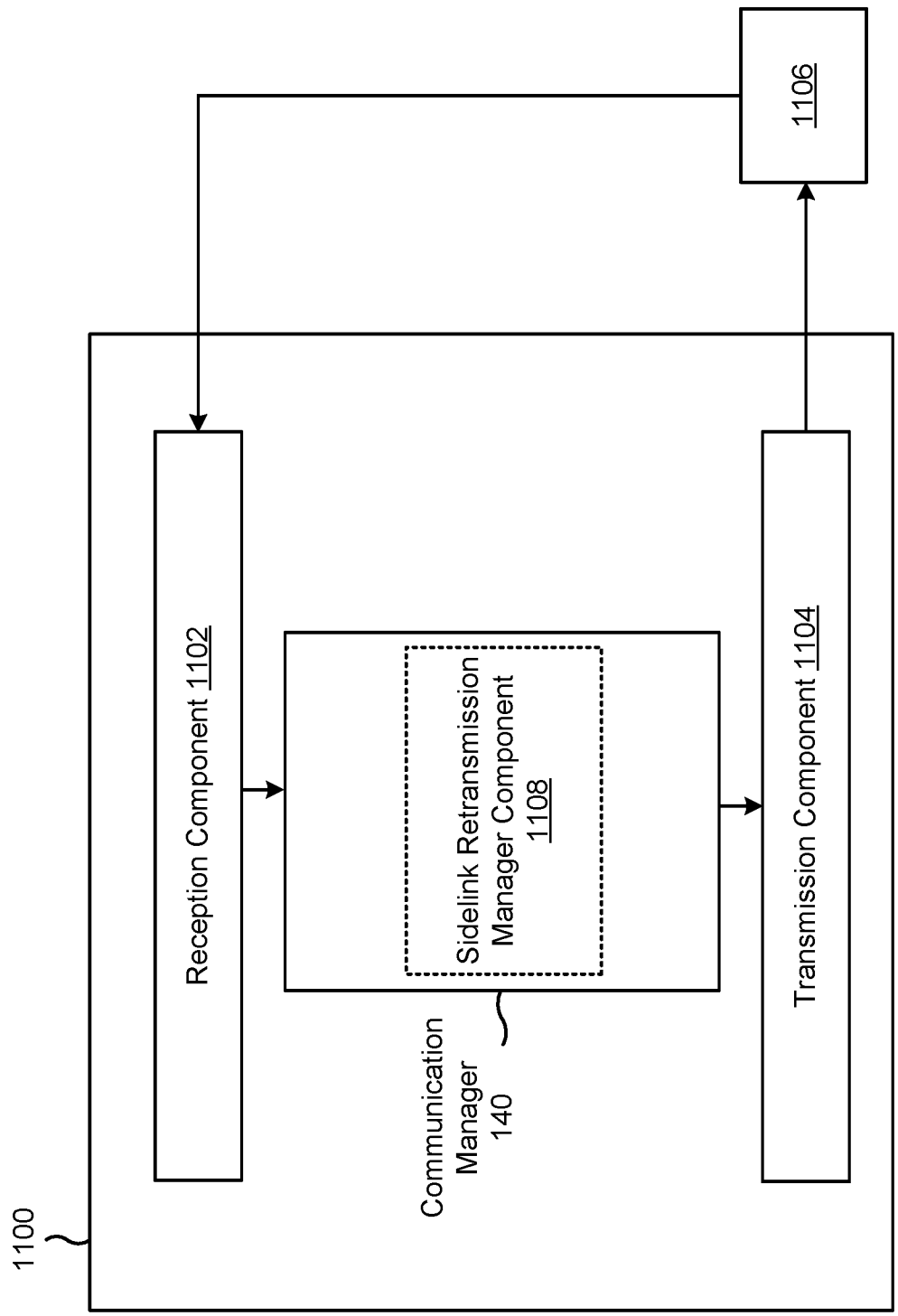
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a sidelink retransmission manager component 1108, among other examples.

In some aspects, the apparatus 1100 may be configured to perform one or more operations described herein in connection with FIGS. 5-10. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The sidelink retransmission manager component 1108 may transmit, by way of the transmission component 1104 and to a network node, a relay scheduling request that indicates a request to schedule access to a Uu based at least in part on relaying one or more sidelink retransmissions associated with at least a first sidelink between the controller UE and a first sidelink UE. The sidelink retransmission manager component 1108 may communicate the one or more sidelink retransmissions between the controller UE and the network node based at least in part on using the Uu.

The transmission component 1104 may transmit a HARQ negative acknowledgement associated with the sidelink HARQ process.

The sidelink retransmission manager component 1108 may set at least one bit that is associated with a scheduling request to a value that indicates the scheduling request is associated with relaying the one or more sidelink retransmissions.

The reception component 1102 may receive a Uu PUSCH grant associated with transmitting at least a buffer status report that is based at least in part on the one or more sidelink retransmissions.

The reception component 1102 may receive a Uu uplink grant that is based at least in part on a priority of at least one sidelink retransmission of the one or more sidelink retransmissions.

The reception component 1102 may receive a Uu uplink grant based at least in part on DCI, and the Uu uplink grant is associated with one or more TB grants.

The sidelink retransmission manager component 1108 may transmit, by way of the transmission component 1104 and prior to receiving the Uu uplink grant, a buffer status report that indicates a transmission size associated with transmitting the aggregated retransmission communication. In some aspects, the sidelink retransmission manager component 1108 may transmit a buffer status report that indicates at least one of a relay direction associated with relaying the one or more sidelink retransmissions, a number of UE-specific sidelink packets associated with relaying the one or more sidelink retransmissions, a packet size associated with a UE-specific sidelink packet, a priority associated with the UE-specific sidelink packet, or a latency bound associated with the UE-specific sidelink packet.

The sidelink retransmission manager component 1108 may receive, by way of the reception component 1102, a retransmission indication that specifies to retransmit at least a portion of the one or more sidelink retransmissions. Alternatively or additionally, the sidelink retransmission manager component 1108 may retransmit, by way of the transmission component 1104, at least a portion of the one or more sidelink retransmissions The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
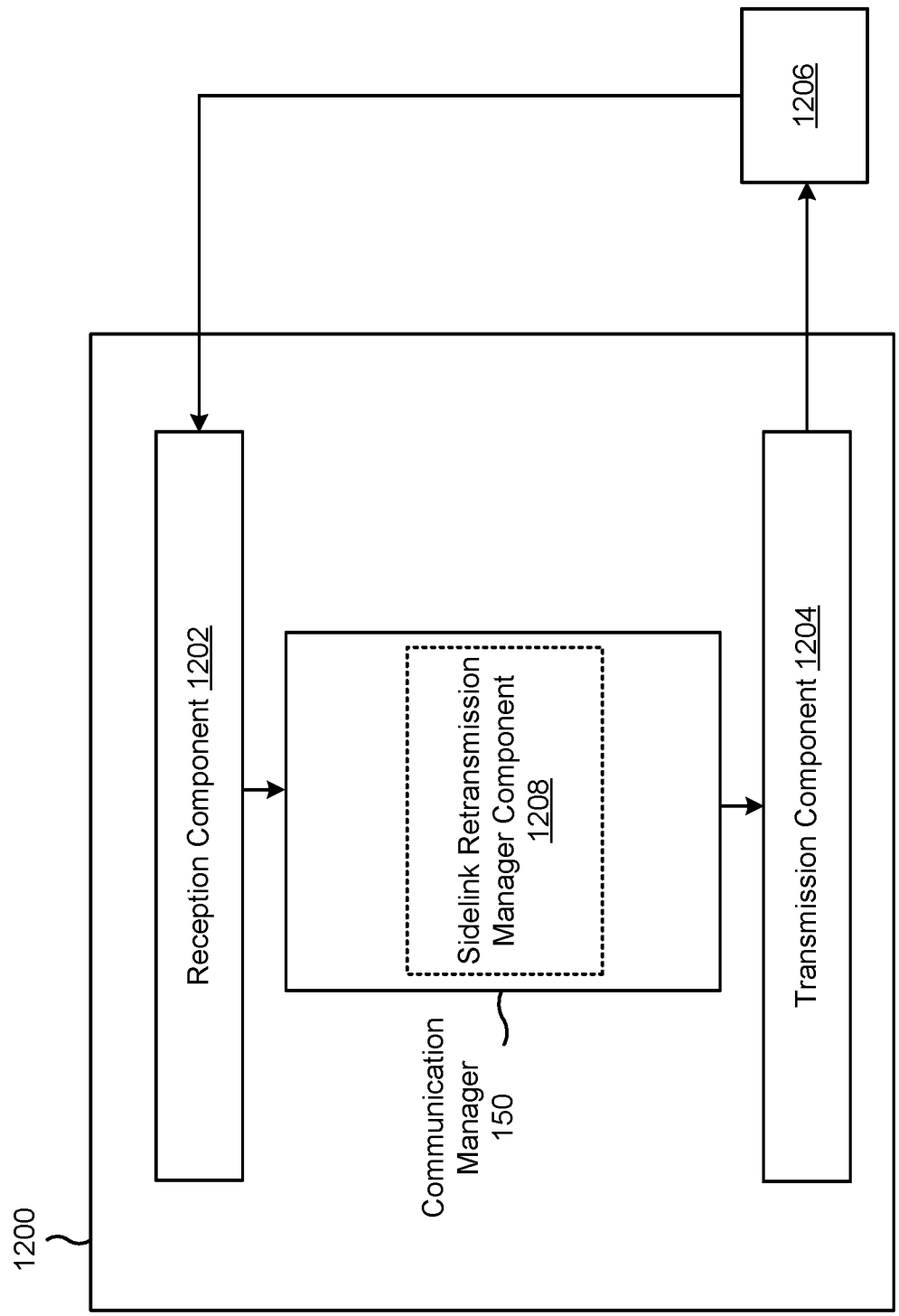
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150) may include one or more of a sidelink retransmission manager component 1208, among other examples.

In some aspects, the apparatus 1200 may be configured to perform one or more operations described herein in connection with FIGS. 5-10. Additionally, or alternatively, the apparatus 1200 may be configured to perform one or more processes described herein, such as process 900 of FIG. 9, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The sidelink retransmission manager component 1208 may receive, by way of the reception component 1202 and from a controller UE, a relay scheduling request that indicates to schedule access to a Uu based at least in part on relaying one or more sidelink retransmissions associated with at least a first sidelink between the controller UE and a first sidelink UE. The sidelink retransmission manager component 1208 may relay the one or more sidelink retransmissions between at least the controller UE and the first sidelink UE based at least in part on the relay scheduling request.

The sidelink retransmission manager component 1208 may indicate, by way of the transmission component 1204, the first Uu PDSCH grant to the first sidelink UE and the second Uu PDSCH grant to the second sidelink UE based at least in part on a CG-PDCCH.

The transmission component 1204 may transmit a Uu PUSCH grant associated with transmitting at least a buffer status report that is based at least in part on the one or more sidelink retransmissions. Alternatively or additionally, the transmission component 1204 may transmit a Uu uplink grant that is based at least in part on a priority of at least one sidelink retransmission of the one or more sidelink retransmissions. In some aspects, the transmission component 1204 may transmit, based at least in part on DCI, a Uu uplink grant that is associated with one or more TB grants.

The sidelink retransmission manager component 1208 may receive, by way of the reception component 1202 and prior to transmission of the Uu uplink grant, a buffer status report that indicates a transmission size associated with transmitting the aggregated retransmission communication. In some aspects, the sidelink retransmission manager component 1208 may receive, by way of the reception component 1202, a buffer status report that indicates at least one of a relay direction associated with relaying the one or more sidelink retransmissions, a number of UE-specific sidelink packets associated with relaying the one or more sidelink retransmissions, a packet size associated with a UE-specific sidelink packet, a priority associated with the UE-specific sidelink packet, or a latency bound associated with the UE-specific sidelink packet.

The sidelink retransmission manager component 1208 may transmit, by way of the transmission component 1204, a retransmission indication that specifies to retransmit at least a portion of the one or more sidelink retransmissions.

The sidelink retransmission manager component 1208 may indicate, by way of the transmission component 1204 and to the controller UE, sidelink retransmission information based at least in part on using a MAC CE. The sidelink retransmission manager component 1208 may indicate, by way of the transmission component 1204 and based at least in part on a first Uu PUSCH grant request, a first Uu PUSCH grant to the first sidelink UE. Alternatively or additionally, the sidelink retransmission manager component 1208 may indicate, by way of the transmission component 1204 and based at least in part on a second Uu PUSCH grant request, a second Uu PUSCH grant to the second sidelink UE.

The sidelink retransmission manager component 1208 may generate an aggregated retransmission communication that includes the first sidelink retransmission with the second sidelink retransmission.

The communication manager 150 may maintain a first Uu connection to the controller UE based at least in part on first Uu CSI associated with the first Uu connection. Alternatively or additionally, the communication manager 150 may maintain a second Uu connection to a second sidelink UE based at least in part on second CSI associated with the second Uu connection.

The sidelink retransmission manager component 1208 may relay, by way of the reception component 1202 and the transmission component 1204, a retransmission HARQ ACK between at least the controller UE and the first sidelink UE. Alternatively or additionally, the sidelink retransmission manager component 1208 may receive, by way of the reception component 1202, a retransmission HARQ NACK. The sidelink retransmission manager component 1208 may transmit, by way of the transmission component 1204, at least a portion of the one or more sidelink retransmissions.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a controller user equipment (UE), comprising: transmitting, to a network node, a relay scheduling request that indicates a request to schedule access to a universal mobile telecommunications system air interface (Uu) based at least in part on relaying one or more sidelink retransmissions associated with at least a first sidelink between the controller UE and a first sidelink UE; and communicating the one or more sidelink retransmissions between the controller UE and the network node based at least in part on using the Uu.

Aspect 2: The method of Aspect 1, wherein the relay scheduling request indicates a Uu uplink grant request between the controller UE and the network node, and wherein communicating the one or more sidelink retransmissions comprises: transmitting, to the network node, the one or more sidelink retransmissions using a Uu uplink grant that is based at least in part on the Uu uplink grant request.

Aspect 3: The method of Aspect 2, wherein the one or more sidelink retransmissions comprise at least: a first sidelink retransmission associated with the first sidelink between the controller UE and the first sidelink UE; and a second sidelink retransmission associated with a second sidelink between the controller UE and a second sidelink UE.

Aspect 4: The method of Aspect 3, wherein communicating the one or more sidelink retransmissions based at least in part on the Uu uplink grant comprises: transmitting the one or more sidelink retransmissions based at least in part on a single aggregated retransmission communication.

Aspect 5: The method of Aspect 4, wherein the Uu uplink grant comprises a physical uplink shared channel (PUSCH) grant.

Aspect 6: The method of Aspect 4 or Aspect 5, wherein the single aggregated retransmission communication includes multiple UE-specific sidelink packets, wherein each UE-specific sidelink packet is associated with a particular sidelink UE, and the method further comprises: indicating sidelink retransmission information associated with the single aggregated retransmission communication, the sidelink retransmission information comprising at least one of: a number of UE-specific sidelink packets included in the single aggregated retransmission communication, a respective starting position of each respective UE-specific sidelink packet of the multiple UE-specific sidelink packets, a respective ending position of each respective UE-specific sidelink packet of the multiple UE-specific sidelink packets, or a respective UE identifier of each respective UE-specific sidelink packet.

Aspect 7: The method of Aspect 6, wherein indicating the sidelink retransmission information comprises: indicating the sidelink retransmission information based at least in part on using at least one of: uplink control information, or a medium access control (MAC) control element (CE).

Aspect 8: The method of Aspect 2, wherein communicating the one or more sidelink retransmissions based at least in part on the Uu uplink grant comprises: transmitting the one or more sidelink retransmissions using multiple aggregated transmissions.

Aspect 9: The method of any one of Aspects 1-8, wherein the relay scheduling request indicates a joint scheduling request associated with: a first scheduling request for a Uu uplink grant associated with an uplink communication from the controller UE to the network node, and a second scheduling request for at least one Uu downlink grant associated with at least a first downlink communication from the network node to at least the first sidelink UE.

Aspect 10: The method of Aspect 9, wherein the joint scheduling request is further associated with at least a second Uu downlink grant associated with a third communication from the network node to a second sidelink UE.

Aspect 11: The method of any one of Aspects 1-10, wherein the relay scheduling request is an explicit two-hop scheduling request.

Aspect 12: The method of any one of Aspects 1-11, wherein transmitting the relay scheduling request comprises: multiplexing the relay scheduling request on a Uu physical uplink control channel (PUCCH).

Aspect 13: The method of Aspect 12, wherein transmitting the relay scheduling request further comprises: transmitting the relay scheduling request based at least in part on a sidelink hybrid automatic repeat request (HARQ) process.

Aspect 14: The method of Aspect 13, further comprising: transmitting a HARQ negative acknowledgement associated with the sidelink HARQ process.

Aspect 15: The method of any one of Aspects 1-14, further comprising: setting at least one bit that is associated with a scheduling request to a value that indicates the scheduling request is associated with relaying the one or more sidelink retransmissions.

Aspect 16: The method of any one of Aspects 1-15, further comprising: receiving a Uu physical uplink shared channel (PUSCH) grant associated with transmitting at least a buffer status report that is based at least in part on the one or more sidelink retransmissions.

Aspect 17: The method of Aspect 16, wherein the Uu PUSCH grant is further associated with transmitting the one or more sidelink retransmissions.

Aspect 18: The method of any one of Aspects 1-18, further comprising: receiving a Uu uplink grant that is based at least in part on a priority of at least one sidelink retransmission of the one or more sidelink retransmissions.

Aspect 19: The method of Aspect 18, wherein the Uu uplink grant is based at least in part on multiple occasions, wherein a first occasion of the multiple occasions is associated with a first sidelink retransmission configured with a first traffic priority, wherein a second occasion of the multiple occasions is associated with a second sidelink retransmission configured with a second traffic priority that is lower than the first traffic priority, and wherein the first occasion occurs before the second occasion.

Aspect 20: The method of any one of Aspects 1-20, further comprising: receiving a Uu uplink grant based at least in part on downlink control information (DCI), wherein the Uu uplink grant is associated with one or more TB grants.

Aspect 21: The method of Aspect 20, wherein the one or more TB grants include at least: a first TB grant associated with a first sidelink retransmission that is based at least in part on the first sidelink between the controller UE and the first sidelink UE, and a second TB grant associated with a second sidelink retransmission that is based at least in part on a second sidelink between the controller UE and a second sidelink UE.

Aspect 22: The method of Aspect 20 or Aspect 21, wherein communicating the one or more sidelink retransmissions comprises: transmitting, based at least in part on the Uu uplink grant, at least: an aggregated retransmission communication that includes the one or more sidelink retransmissions, and uplink control information that indicates one or more destination addresses of the one or more sidelink retransmissions.

Aspect 23: The method of Aspect 22, further comprising: transmitting, prior to receiving the Uu uplink grant, a buffer status report that indicates a transmission size associated with transmitting the aggregated retransmission communication.

Aspect 24: The method of any one of Aspects 1-23, wherein the relay scheduling request is associated with a logical channel.

Aspect 25: The method of any one of Aspects 1-24, wherein the relay scheduling request includes a scheduling request identifier field that indicates a relaying request.

Aspect 26: The method of Aspect 25, wherein the scheduling request identifier field is a one-bit field.

Aspect 27: The method of any one of Aspects 1-26, wherein the relay scheduling request indicates one of multiple preconfigured packet sizes.

Aspect 28: The method of any one of Aspects 1-28, wherein the relay scheduling request indicates a relay direction.

Aspect 29: The method of any one of Aspects 1-28, further comprising: transmitting a buffer status report that indicates at least one of: a relay direction associated with relaying the one or more sidelink retransmissions, a number of UE-specific sidelink packets associated with relaying the one or more sidelink retransmissions, a packet size associated with a UE-specific sidelink packet, a priority associated with the UE-specific sidelink packet, or a latency bound associated with the UE-specific sidelink packet.

Aspect 30: The method of any one of Aspects 1-29, further comprising: receiving a retransmission indication that specifies to retransmit at least a portion of the one or more sidelink retransmissions.

Aspect 31: The method of Aspect 30, wherein the retransmission indication specifies to retransmit an entirety of the one or more sidelink retransmissions.

Aspect 32: The method of Aspect 30, wherein the retransmission indication specifies to retransmit a UE-specific portion of the one or more sidelink retransmissions.

Aspect 33: The method of any one of Aspects 1-32, wherein the relay scheduling request indicates a Uu downlink grant request associated with the controller UE, and wherein communicating the one or more sidelink retransmissions comprises: receiving, based at least in part on the Uu downlink grant request, the one or more sidelink retransmissions from the network node.

Aspect 34: The method of Aspect 33, wherein the one or more sidelink retransmissions comprise at least: a first sidelink retransmission associated with the first sidelink between the controller UE and the first sidelink UE, and a second sidelink retransmission associated with a second sidelink between the controller UE and a second sidelink UE.

Aspect 35: The method of Aspect 34, wherein receiving the one or more sidelink retransmissions comprises: receiving the one or more sidelink retransmissions in a single aggregated retransmission communication.

Aspect 36: The method of Aspect 34 or Aspect 35, wherein the relay scheduling request indicates at least: a first physical uplink shared channel (PUSCH) grant request associated with a first uplink transmission between the first sidelink UE and the network node, and a second PUSCH grant request associated with a second uplink transmission between the second sidelink UE and the network node.

Aspect 37: A method of wireless communication performed by a network node, comprising: receiving, from a controller user equipment (UE), a relay scheduling request that indicates to schedule access to a universal mobile telecommunications system air interface (Uu) based at least in part on relaying one or more sidelink retransmissions associated with at least a first sidelink between the controller UE and a first sidelink UE; and relaying the one or more sidelink retransmissions between at least the controller UE and the first sidelink UE based at least in part on the relay scheduling request.

Aspect 38: The method of Aspect 37, wherein the relay scheduling request indicates a Uu uplink grant request between the controller UE and the network node, and wherein relaying the one or more sidelink retransmissions comprises: receiving, based at least in part on a Uu uplink grant, the one or more sidelink retransmissions from the controller UE, and transmitting, based at least in part on at least one Uu downlink grant, the one or more sidelink retransmissions to at least the first sidelink UE.

Aspect 39: The method of Aspect 38, wherein the one or more sidelink retransmissions comprise at least: a first sidelink retransmission associated with the first sidelink between the controller UE and the first sidelink UE; and a second sidelink retransmission associated with a second sidelink between the controller UE and a second sidelink UE.

Aspect 40: The method of Aspect 39, wherein the at least one UU downlink grant comprises a first Uu downlink grant and a second Uu downlink grant, and wherein transmitting the one or more sidelink retransmissions to at least the first sidelink UE comprises: transmitting, based at least in part on the first Uu downlink grant, the first sidelink retransmission to the first sidelink UE; and transmitting, based at least in part on the second Uu downlink grant, the second sidelink retransmission to the second sidelink UE.

Aspect 41: The method of Aspect 40, wherein the first Uu downlink grant comprises a first Uu physical downlink shared channel (PDSCH) grant, and wherein the second Uu downlink grant comprises a second Uu PDSCH grant.

Aspect 42: The method of Aspect 41, further comprising: indicating the first Uu PDSCH grant to the first sidelink UE and the second Uu PDSCH grant to the second sidelink UE based at least in part on a common group physical downlink control channel (CG-PDCCH).

Aspect 43: The method of Aspect 41 or Aspect 42, wherein at least one of the first Uu PDSCH grant and the second Uu PDSCH grant is based at least in part on at least one of: a buffer status report from the controller UE, or uplink control information that indicates sidelink retransmission information.

Aspect 44: The method of any one of Aspects 37-43, wherein receiving the one or more sidelink retransmissions comprises: receiving the one or more sidelink retransmissions as a single aggregated retransmission communication.

Aspect 45: The method of Aspect 44, wherein receiving the one or more sidelink retransmissions as the single aggregated retransmission communication comprises: receiving the single aggregated retransmission communication based at least in part on a single Uu physical uplink shared channel (PUSCH) grant.

Aspect 46: The method of Aspect 44 or Aspect 45, wherein the single aggregated retransmission communication includes multiple UE-specific sidelink packets, and the method further comprises: receiving sidelink retransmission information associated with the single aggregated retransmission communication, the sidelink retransmission information comprising at least one of: a number of UE-specific sidelink packets included in the single aggregated retransmission communication, a respective starting position of each respective UE-specific sidelink packet of the multiple UE-specific sidelink packets, a respective ending position of each respective UE-specific sidelink packet of the multiple UE-specific sidelink packets, or a respective UE identifier of each respective UE-specific sidelink packet.

Aspect 47: The method of Aspect 46, wherein receiving the sidelink retransmission information comprises: receiving the sidelink retransmission information based at least in part on using at least one of: uplink control information, or a medium access control (MAC) control element (CE).

Aspect 48: The method of any one of Aspects 37-47, wherein the relay scheduling request indicates a joint scheduling request associated with: a first scheduling request for at least one Uu uplink grant from the controller UE to the network node, and a second scheduling request for at least one Uu downlink grant from the network node to the first sidelink UE.

Aspect 49: The method of any one of Aspects 37-48, wherein the relay scheduling request is an explicit two-hop scheduling request.

Aspect 50: The method of any one of Aspects 37-49, wherein receiving the relay scheduling request comprises: receiving the relay scheduling request based at least in part on a Uu physical uplink control channel (PUCCH).

Aspect 51: The method of Aspect 50, wherein receiving the relay scheduling request further comprises: receiving the relay scheduling request based at least in part on a sidelink hybrid automatic repeat request (HARQ) process.

Aspect 52: The method of Aspect 51, wherein receiving the relay scheduling request further comprises: receiving the relay scheduling request based at least in part on a HARQ negative acknowledgement associated with the sidelink HARQ process.

Aspect 53: The method of any one of Aspects 37-52, wherein the relay scheduling request is based at least in part on a first bit of multiple bits that are associated with a scheduling request, wherein the first bit indicates a value that is associated with a request to relay the one or more sidelink retransmissions.

Aspect 54: The method of any one of Aspects 37-53, further comprising: transmitting a Uu physical uplink shared channel (PUSCH) grant associated with transmitting at least a buffer status report that is based at least in part on the one or more sidelink retransmissions.

Aspect 55: The method of Aspect 54, wherein the Uu PUSCH grant is further associated with transmitting the one or more sidelink retransmissions.

Aspect 56: The method of any one of Aspects 37-55, further comprising: transmitting a Uu uplink grant that is based at least in part on a priority of at least one sidelink retransmission of the one or more sidelink retransmissions.

Aspect 57: The method of Aspect 56, wherein the Uu uplink grant is based at least in part on multiple occasions, wherein a first occasion of the multiple occasions is associated with a first sidelink retransmission configured with a first traffic priority, wherein a second occasion of the multiple occasions is associated with a second sidelink retransmission configured with a second traffic priority that is lower than the first traffic priority, and wherein the first occasion occurs before the second occasion.

Aspect 58: The method of any one of Aspects 37-57, further comprising: transmitting, based at least in part on downlink control information (DCI), a Uu uplink grant that is associated with one or more transport block (TB) grants.

Aspect 59: The method of Aspect 58, wherein the one or more TB grants include at least: a first TB grant associated with a first sidelink retransmission that is based at least in part on the first sidelink between the controller UE and the first sidelink UE, and a second TB grant associated with a second sidelink retransmission that is based at least in part on a second sidelink between the controller UE and a second sidelink UE.

Aspect 60: The method of Aspect 58 or Aspect 59, wherein relaying the one or more sidelink retransmissions comprises: receiving, from the controller UE and based at least in part on the Uu uplink grant: an aggregated retransmission communication that includes the one or more sidelink retransmissions, and uplink control information that indicates one or more destination addresses of the one or more sidelink retransmissions.

Aspect 61: The method of Aspect 60, further comprising: receiving, prior to transmitting the Uu uplink grant, a buffer status report that indicates a transmission size associated with transmitting the aggregated retransmission communication.

Aspect 62: The method of any one of Aspects 37-61 wherein the relay scheduling request is associated with a logical channel.

Aspect 63: The method of any one of Aspects 37-62, wherein the relay scheduling request includes a scheduling request identifier field that indicates a relaying request.

Aspect 64: The method of Aspect 63, wherein the scheduling request identifier field is a one-bit field.

Aspect 65: The method of any one of Aspects 37-64, wherein the relay scheduling request indicates one of multiple preconfigured packet sizes.

Aspect 66: The method of any one of Aspects 37-65, wherein the relay scheduling request indicates a relay direction.

Aspect 67: The method of any one of Aspects 37-66, further comprising: receiving a buffer status report that indicates at least one of: a relay direction associated with relaying the one or more sidelink retransmissions, a number of UE-specific sidelink packets associated with relaying the one or more sidelink retransmissions, a packet size associated with a UE-specific sidelink packet, a priority associated with the UE-specific sidelink packet, or a latency bound associated with the UE-specific sidelink packet.

Aspect 68: The method of any one of Aspects 37-67, further comprising: transmitting a retransmission indication that specifies to retransmit at least a portion of the one or more sidelink retransmissions.

Aspect 69: The method of Aspect 68, wherein the retransmission indication specifies to retransmit an entirety of the one or more sidelink retransmissions.

Aspect 70: The method of Aspect 69, wherein the retransmission indication specifies to retransmit a UE-specific portion of the one or more sidelink retransmissions.

Aspect 71: The method of Aspect 37, wherein the relay scheduling request indicates a Uu downlink grant request associated with the controller UE, and wherein relaying the one or more sidelink retransmissions comprises: transmitting, to the controller UE and based at least in part on the Uu downlink grant request, the one or more sidelink retransmissions.

Aspect 72: The method of Aspect 71, further comprising: indicating, to the controller UE, sidelink retransmission information based at least in part on using a medium access control (MAC) control element (CE).

Aspect 73: The method of Aspect 71 or Aspect 72, wherein the one or more sidelink retransmissions comprise at least: a first sidelink retransmission from the first sidelink UE to the controller UE, and a second sidelink retransmission from a second sidelink UE to the controller UE.

Aspect 74: The method of Aspect 73, wherein the relay scheduling request indicates at least: a first Uu physical uplink shared channel (PUSCH) grant request associated with a first uplink transmission between the first sidelink UE and the network node, and a second Uu PUSCH grant request associated with a second uplink transmission between the second sidelink UE and the network node.

Aspect 75: The method of Aspect 74, further comprising: indicating, based at least in part on the first Uu PUSCH grant request, a first Uu PUSCH grant to the first sidelink UE; and indicating, based at least in part on the second Uu PUSCH grant request, a second Uu PUSCH grant to the second sidelink UE.

Aspect 76: The method of Aspect 75, wherein indicating the first Uu PUSCH grant and indicating the second Uu PUSCH grant comprises: transmitting a first indication of the first Uu PUSCH grant and a second indication of the second Uu PUSCH grant based at least in part on using a common group physical downlink control channel (CG-PDCCH).

Aspect 77: The method of Aspect 75 or Aspect 76, wherein relaying the one or more sidelink retransmissions further comprises: receiving the first sidelink retransmission from the first sidelink UE based at least in part on the first Uu PUSCH grant; and receiving the second sidelink retransmission from the second sidelink UE based at least in part on the second Uu PUSCH grant.

Aspect 78: The method of Aspect 77, further comprising: generating an aggregated retransmission communication that includes the first sidelink retransmission with the second sidelink retransmission, wherein transmitting the one or more sidelink retransmissions comprises: transmitting the aggregated retransmission communication to the controller UE based at least in part on a single UU downlink grant. wherein transmitting the one or more sidelink retransmissions comprises: transmitting the aggregated retransmission communication to the controller UE based at least in part on a single UU downlink grant.

Aspect 79: The method of any one of Aspects 37-78, further comprising: maintaining a first Uu connection to the controller UE based at least in part on first Uu channel state information (CSI) associated with the first Uu connection; and maintaining a second Uu connection to a second sidelink UE based at least in part on second CSI associated with the second Uu connection.

Aspect 80: The method of any one of Aspects 37-79, further comprising: relaying a retransmission hybrid automatic repeat request (HARQ) acknowledge between at least the controller UE and the first sidelink UE.

Aspect 81: The method of any one of Aspects 37-80, further comprising: receiving a retransmission hybrid automatic repeat request (HARQ) negative acknowledge; and retransmitting at least a portion of the one or more sidelink retransmissions.

Aspect 82: The method of Aspect 81, wherein retransmitting at least a portion of the one or more sidelink retransmissions comprises: retransmitting an entirety of the one or more sidelink retransmissions.

Aspect 83: The method of Aspect 81, wherein retransmitting at least a portion of the one or more sidelink retransmissions comprises: retransmitting a UE-specific portion of the one or more sidelink retransmissions.

Aspect 84: An apparatus for wireless communication at a device, comprising a processor; memory coupled with the processor; and instructions stored in the memory and executable by the processor to cause the apparatus to perform the method of one or more of Aspects 1-36.

Aspect 85: An apparatus for wireless communication at a device, comprising a processor; memory coupled with the processor; and instructions stored in the memory and executable by the processor to cause the apparatus to perform the method of one or more of Aspects 37-83.

Aspect 86: A device for wireless communication, comprising a memory and one or more processors coupled to the memory, the one or more processors configured to perform the method of one or more of Aspects 1-36.

Aspect 87: A device for wireless communication, comprising a memory and one or more processors coupled to the memory, the one or more processors configured to perform the method of one or more of Aspects 37-83.

Aspect 88: An apparatus for wireless communication, comprising at least one means for performing the method of one or more of Aspects 1-36.

Aspect 89: An apparatus for wireless communication, comprising at least one means for performing the method of one or more of Aspects 37-83.

Aspect 90: A non-transitory computer-readable medium storing code for wireless communication, the code comprising instructions executable by a processor to perform the method of one or more of Aspects 1-36.

Aspect 91: A non-transitory computer-readable medium storing code for wireless communication, the code comprising instructions executable by a processor to perform the method of one or more of Aspects 37-83.

Aspect 92: A non-transitory computer-readable medium storing a set of instructions for wireless communication, the set of instructions comprising one or more instructions that, when executed by one or more processors of a device, cause the device to perform the method of one or more of Aspects 1-36.

Aspect 93: A non-transitory computer-readable medium storing a set of instructions for wireless communication, the set of instructions comprising one or more instructions that, when executed by one or more processors of a device, cause the device to perform the method of one or more of Aspects 37-83.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a controller user equipment (UE), comprising:
one or more memories; and
one or more processors, coupled to the one or more memories, configured to cause the apparatus to:
transmit, to a network node, a relay scheduling request that indicates a request to schedule access to a universal mobile telecommunications system air interface (Uu) based at least in part on relaying one or more sidelink retransmissions associated with at least a first sidelink between the controller UE and a first sidelink UE, wherein the relay scheduling request indicates one or more of:
a Uu downlink grant request associated with the controller UE,
a Uu uplink grant request between the controller UE and the network node, or
a joint scheduling request associated with: a first scheduling request for a Uu uplink grant associated with an uplink communication from the controller UE to the network node, and a second scheduling request for at least one Uu downlink grant associated with at least a first downlink communication from the network node to at least the first sidelink UE; and
communicate the one or more sidelink retransmissions between the controller UE and the network node based at least in part on using the Uu.

2. The apparatus of claim 1, wherein the relay scheduling request indicates the Uu uplink grant request, and
wherein the one or more processors, to communicate the one or more sidelink retransmissions, are configured to cause the apparatus to:
transmit, to the network node, the one or more sidelink retransmissions using a Uu uplink grant that is based at least in part on the Uu uplink grant request.

3. The apparatus of claim 2, wherein the one or more sidelink retransmissions comprise at least:
a first sidelink retransmission associated with the first sidelink between the controller UE and the first sidelink UE; and
a second sidelink retransmission associated with a second sidelink between the controller UE and a second sidelink UE.

4. The apparatus of claim 3, wherein the one or more processors, to communicate the one or more sidelink retransmissions based at least in part on the Uu uplink grant, are configured to cause the apparatus to:
transmit the one or more sidelink retransmissions based at least in part on a single aggregated retransmission communication.

5. The apparatus of claim 4, wherein the single aggregated retransmission communication includes multiple UE-specific sidelink packets, wherein each UE-specific sidelink packet is associated with a particular sidelink UE, and the one or more processors are further configured to cause the apparatus to:
indicate sidelink retransmission information associated with the single aggregated retransmission communication, the sidelink retransmission information comprising at least one of:
a number of UE-specific sidelink packets included in the single aggregated retransmission communication,
a respective starting position of each respective UE-specific sidelink packet of the multiple UE-specific sidelink packets,
a respective ending position of each respective UE-specific sidelink packet of the multiple UE-specific sidelink packets, or
a respective UE identifier of each respective UE-specific sidelink packet.

6. The apparatus of claim 1, wherein the one or more processors, to transmit the relay scheduling request, are configured to cause the apparatus to:
transmit the relay scheduling request based at least in part on a sidelink hybrid automatic repeat request (HARQ) process.

7. The apparatus of claim 1, wherein the one or more processors are further configured to cause the apparatus to:
set at least one bit that is associated with a scheduling request to a value that indicates the scheduling request is associated with relaying the one or more sidelink retransmissions.

8. The apparatus of claim 1, wherein the one or more processors are further configured to cause the apparatus to:
receive a Uu uplink grant that is based at least in part on a priority of at least one sidelink retransmission of the one or more sidelink retransmissions.

9. The apparatus of claim 1, wherein the one or more processors are further configured to cause the apparatus to:
transmit a buffer status report that indicates at least one of:
a relay direction associated with relaying the one or more sidelink retransmissions,
a number of UE-specific sidelink packets associated with relaying the one or more sidelink retransmissions,
a packet size associated with a UE-specific sidelink packet,
a priority associated with the UE-specific sidelink packet, or
a latency bound associated with the UE-specific sidelink packet.

10. The apparatus of claim 1, wherein the one or more processors are further configured to cause the apparatus to:
receive a retransmission indication that specifies to retransmit at least a portion of the one or more sidelink retransmissions.

11. The apparatus of claim 1, wherein the relay scheduling request indicates the Uu downlink grant request, and
wherein the one or more processors, to communicate the one or more sidelink retransmissions, are configured to cause the apparatus to:
receive, based at least in part on the Uu downlink grant request, the one or more sidelink retransmissions from the network node.

12. The apparatus of claim 11, wherein the one or more sidelink retransmissions comprise at least:
a first sidelink retransmission associated with the first sidelink between the controller UE and the first sidelink UE, and
a second sidelink retransmission associated with a second sidelink between the controller UE and a second sidelink UE.

13. The apparatus of claim 11, wherein the one or more processors, to receive the one or more sidelink retransmissions, are configured to cause the apparatus to:
receive the one or more sidelink retransmissions in a single aggregated retransmission communication.

14. An apparatus for wireless communication at a network node, comprising:
one or more memories; and
one or more processors, coupled to the one or more memories, configured to cause the apparatus to:
receive, from a controller user equipment (UE), a relay scheduling request that indicates to schedule access to a universal mobile telecommunications system air interface (Uu) based at least in part on relaying one or more sidelink retransmissions associated with at least a first sidelink between the controller UE and a first sidelink UE, wherein the relay scheduling request indicates one or more of:
a Uu downlink grant request associated with the controller UE,
a Uu uplink grant request between the controller UE and the network node, or
a joint scheduling request associated with: a first scheduling request for a Uu uplink grant associated with an uplink communication from the controller UE to the network node, and a second scheduling request for at least one Uu downlink grant associated with at least a first downlink communication from the network node to at least the first sidelink UE; and relay the one or more sidelink retransmissions between at least the controller UE and the first sidelink UE based at least in part on the relay scheduling request.

15. The apparatus of claim 14, wherein the relay scheduling request indicates the Uu uplink grant request, and wherein the one or more processors, to relay the one or more sidelink retransmissions, are configured to cause the apparatus to:
receive, based at least in part on a Uu uplink grant, the one or more sidelink retransmissions from the controller UE, and
transmit, based at least in part on at least one Uu downlink grant, the one or more sidelink retransmissions to at least the first sidelink UE.

16. The apparatus of claim 15, wherein the one or more sidelink retransmissions comprise at least:
a first sidelink retransmission associated with the first sidelink between the controller UE and the first sidelink UE; and
a second sidelink retransmission associated with a second sidelink between the controller UE and a second sidelink UE.

17. The apparatus of claim 16, wherein the at least one Uu downlink grant comprises a first Uu downlink grant and a second Uu downlink grant, and
wherein the one or more processors, to transmit the one or more sidelink retransmissions to at least the first sidelink UE, are configured to cause the apparatus to:
transmit, based at least in part on the first Uu downlink grant, the first sidelink retransmission to the first sidelink UE; and
transmit, based at least in part on the second Uu downlink grant, the second sidelink retransmission to the second sidelink UE.

18. The apparatus of claim 14, wherein the one or more processors, to receive the one or more sidelink retransmissions, are configured to cause the apparatus to:
receive the one or more sidelink retransmissions as a single aggregated retransmission communication.

19. The apparatus of claim 14, wherein the relay scheduling request indicates the joint scheduling request, wherein the one or more processors, to relay the one or more sidelink retransmissions, are configured to cause the apparatus to:
receive, from the controller UE and based at least in part on the Uu uplink grant:
an aggregated retransmission communication that includes the one or more sidelink retransmissions, and
uplink control information that indicates one or more destination addresses of the one or more sidelink retransmissions.

20. The apparatus of claim 14, wherein the one or more processors are further configured to cause the apparatus to:
transmit a retransmission indication that specifies to retransmit at least a portion of the one or more sidelink retransmissions.

21. The apparatus of claim 14, wherein the relay scheduling request indicates the Uu downlink grant request, and wherein the one or more processors, to relay the one or more sidelink retransmissions, are configured to cause the apparatus to:
transmit, to the controller UE and based at least in part on the Uu downlink grant request, the one or more sidelink retransmissions.

22. The apparatus of claim 21, wherein the one or more sidelink retransmissions comprise at least:
a first sidelink retransmission from the first sidelink UE to the controller UE, and
a second sidelink retransmission from a second sidelink UE to the controller UE.

23. The apparatus of claim 22, wherein the relay scheduling request indicates at least:
a first Uu physical uplink shared channel (PUSCH) grant request associated with a first uplink transmission between the first sidelink UE and the network node, and
a second Uu PUSCH grant request associated with a second uplink transmission between the second sidelink UE and the network node.

24. The apparatus of claim 23, wherein the one or more processors are further configured to cause the apparatus to:
indicate, based at least in part on the first Uu PUSCH grant request, a first Uu PUSCH grant to the first sidelink UE; and
indicate, based at least in part on the second Uu PUSCH grant request, a second Uu PUSCH grant to the second sidelink UE.

25. The apparatus of claim 24, wherein the one or more processors, to indicate the first Uu PUSCH grant and indicating the second Uu PUSCH grant, are configured to cause the apparatus to:
transmit a first indication of the first Uu PUSCH grant and a second indication of the second Uu PUSCH grant based at least in part on using a common group physical downlink control channel (CG-PDCCH).

26. The apparatus of claim 25, wherein the one or more processors are further configured to cause the apparatus to:
generate an aggregated retransmission communication that includes the first sidelink retransmission with the second sidelink retransmission; and
transmit the one or more sidelink retransmissions by transmitting the aggregated retransmission communication to the controller UE based at least in part on a single UU downlink grant.

27. A method of wireless communication performed by a controller user equipment (UE), comprising:
transmitting, to a network node, a relay scheduling request that indicates a request to schedule access to a universal mobile telecommunications system air interface (Uu) based at least in part on relaying one or more sidelink retransmissions associated with at least a first sidelink between the controller UE and a first sidelink UE, wherein the relay scheduling request indicates one or more of:
a Uu downlink grant request associated with the controller UE,
a Uu uplink grant request between the controller UE and the network node, or
a joint scheduling request associated with: a first scheduling request for a Uu uplink grant associated with an uplink communication from the controller UE to the network node, and a second scheduling request for at least one Uu downlink grant associated with at least a first downlink communication from the network node to at least the first sidelink UE; and
communicating the one or more sidelink retransmissions between the controller UE and the network node based at least in part on using the Uu.

28. A method of wireless communication performed by a network node, comprising:
receiving, from a controller user equipment (UE), a relay scheduling request that indicates to schedule access to a universal mobile telecommunications system air interface (Uu) based at least in part on relaying one or more sidelink retransmissions associated with at least a first sidelink between the controller UE and a first sidelink UE, wherein the relay scheduling request indicates one or more of:
- a Uu downlink grant request associated with the controller UE,
- a Uu uplink grant request between the controller UE and the network node, or
- a joint scheduling request associated with: a first scheduling request for a Uu uplink grant associated with an uplink communication from the controller UE to the network node, and a second scheduling request for at least one Uu downlink grant associated with at least a first downlink communication from the network node to at least the first sidelink UE; and relaying the one or more sidelink retransmissions between at least the controller UE and the first sidelink UE based at least in part on the relay scheduling request.

29. The method of claim 27, wherein the relay scheduling request includes a scheduling request identifier field that indicates a two-hop scheduling request.

30. The method of claim 28, wherein the relay scheduling request comprises a scheduling request identifier field indicating a two-hop scheduling request.

* * * * *